(12) United States Patent
Pawluk

(10) Patent No.: US 9,789,799 B2
(45) Date of Patent: Oct. 17, 2017

(54) CONVERTIBLE TRAILER

(75) Inventor: William Pawluk, Calgary (CA)

(73) Assignee: Convertible Trailer Patent Company Ltd., Calgary (CA)

( * ) Notice: Subject to any disclaimer, the term of this patent is extended or adjusted under 35 U.S.C. 154(b) by 488 days.

(21) Appl. No.: 13/698,863

(22) PCT Filed: May 18, 2010

(86) PCT No.: PCT/CA2010/000757
§ 371 (c)(1),
(2), (4) Date: Nov. 19, 2012

(87) PCT Pub. No.: WO2011/143734
PCT Pub. Date: Nov. 24, 2011

(65) Prior Publication Data
US 2013/0064632 A1    Mar. 14, 2013

(51) Int. Cl.
| | | |
|---|---|---|
| B60P 1/04 | (2006.01) |
| B60P 1/43 | (2006.01) |
| B60P 3/08 | (2006.01) |
| B60P 3/42 | (2006.01) |
| B60P 3/06 | (2006.01) |
| B62D 63/06 | (2006.01) |

(52) U.S. Cl.
CPC ............. B60P 1/433 (2013.01); B60P 3/06 (2013.01); B60P 3/08 (2013.01); B60P 3/42 (2013.01); B62D 63/06 (2013.01)

(58) Field of Classification Search
CPC ............ B60P 1/00; B60P 3/1033; B60G 1/00
USPC ................................ 414/471, 495, 498, 482
See application file for complete search history.

(56) References Cited

U.S. PATENT DOCUMENTS

| | | | |
|---|---|---|---|
| 2,668,734 A | | 2/1954 | Bridge |
| 4,081,196 A | * | 3/1978 | Dandridge, Jr. ................ 410/28 |
| 4,221,422 A | * | 9/1980 | Harold ........................ 410/24.1 |
| 4,738,575 A | | 4/1988 | Blodgett et al. |
| 4,789,281 A | | 12/1988 | Westerdale |
| 4,881,859 A | * | 11/1989 | Ehrlich ........................ 410/29.1 |
| 5,051,046 A | | 9/1991 | Oren |
| 5,080,541 A | | 1/1992 | Andre |
| 5,114,202 A | | 5/1992 | Johnson |
| 5,332,345 A | * | 7/1994 | Lillard ........................ 410/29.1 |
| 5,595,465 A | | 1/1997 | Knott |

(Continued)

FOREIGN PATENT DOCUMENTS

AU       B-47250/89       6/1990

*Primary Examiner* — Anna Momper
*Assistant Examiner* — Willie Berry, Jr.
(74) *Attorney, Agent, or Firm* — Antony C. Edwards

(57) ABSTRACT

A convertible trailer system includes a convertible trailer having a segmented lower deck, and a segmented upper deck mounted thereover. The segmented lower deck includes floating forward and rear belly ramps which are independently actuable relative to each other so as to be selectively raised and lowered relative to a pair of side rails which define the belly forward of the trailer wheels. When in a fully lowered position the belly ramps are lowered to a lower extremity between the pair of side rails so as to be substantially entirely below uppermost edges of the pair of side rails. When in an elevated position the belly ramps are elevated so as to be co-planar with or above the uppermost edges of the side rails whereby freight may be loaded laterally onto the belly ramps over the pair of side rails.

11 Claims, 25 Drawing Sheets

(56) References Cited

U.S. PATENT DOCUMENTS

| | | |
|---|---|---|
| 5,676,507 A | 10/1997 | Lugo |
| 6,368,034 B1 | 4/2002 | Frye |
| 6,497,541 B2 | 12/2002 | Pawluk |
| 6,688,818 B2 | 2/2004 | Bishop |
| 2006/0083597 A1 | 4/2006 | Chang |

* cited by examiner

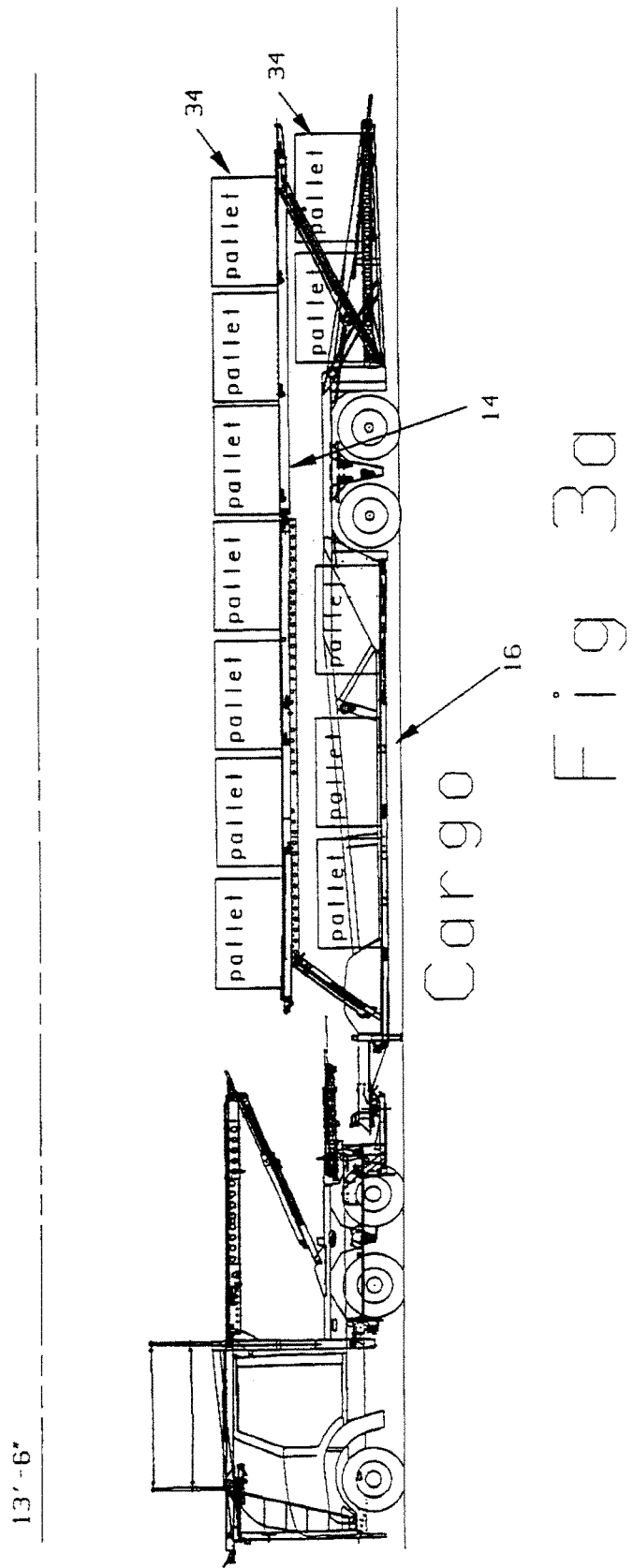

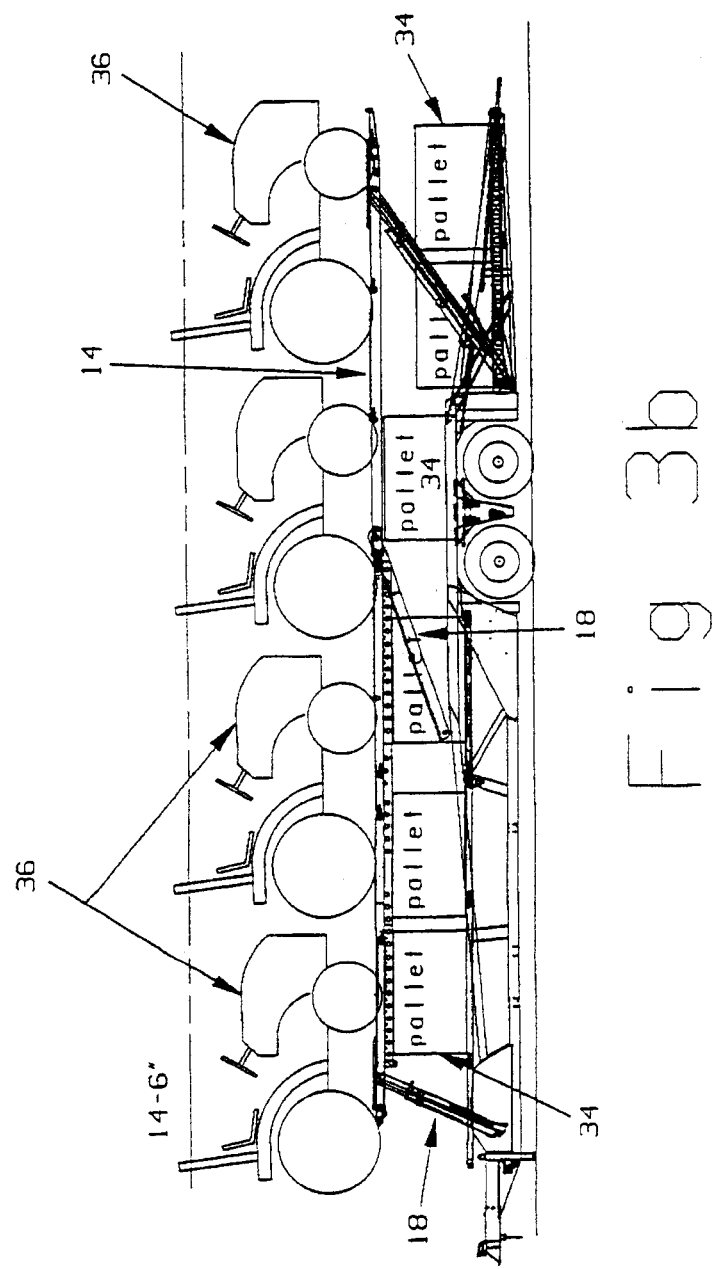

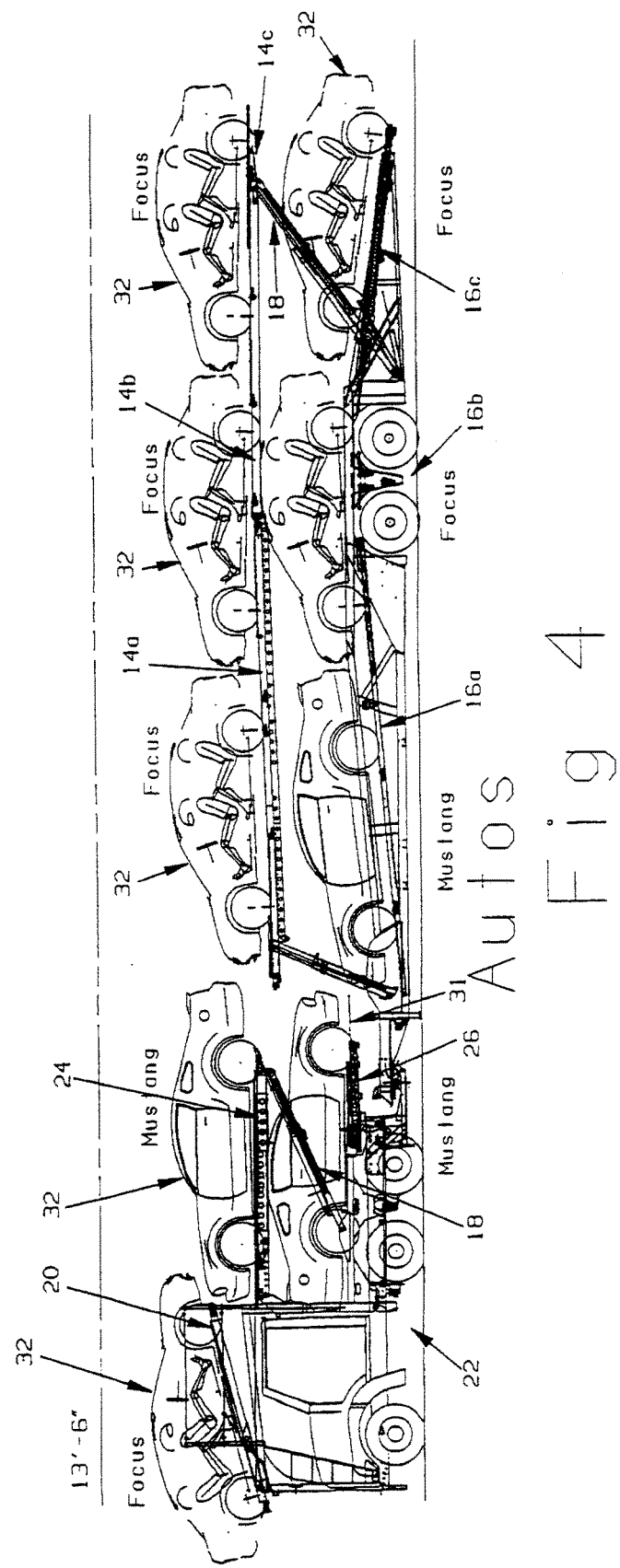

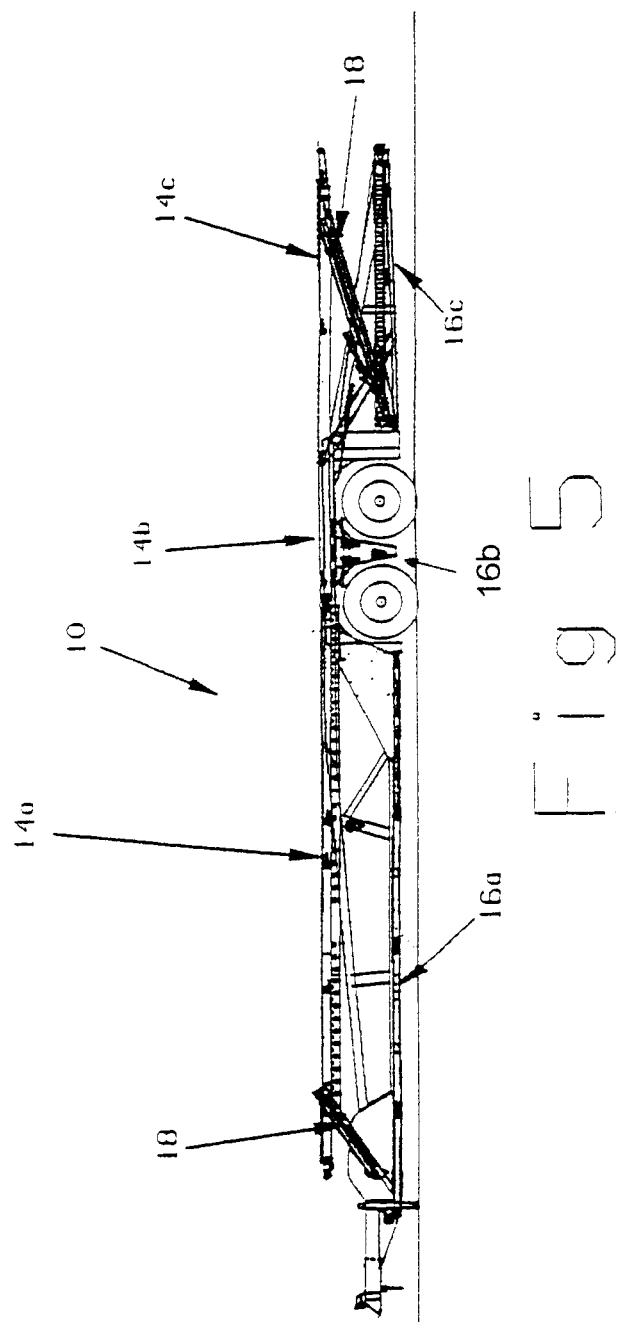

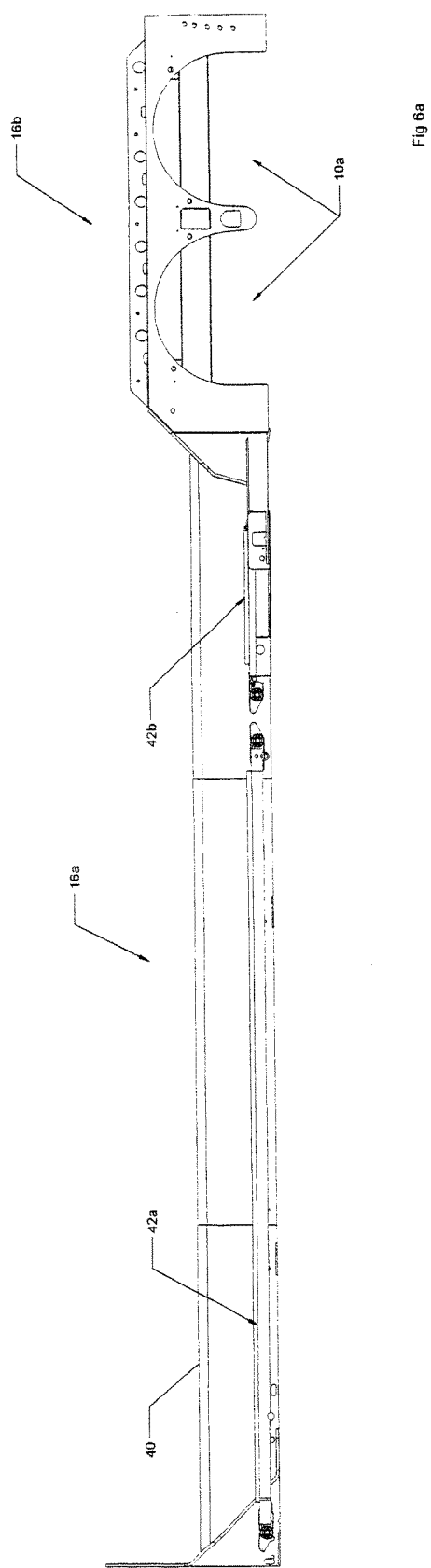

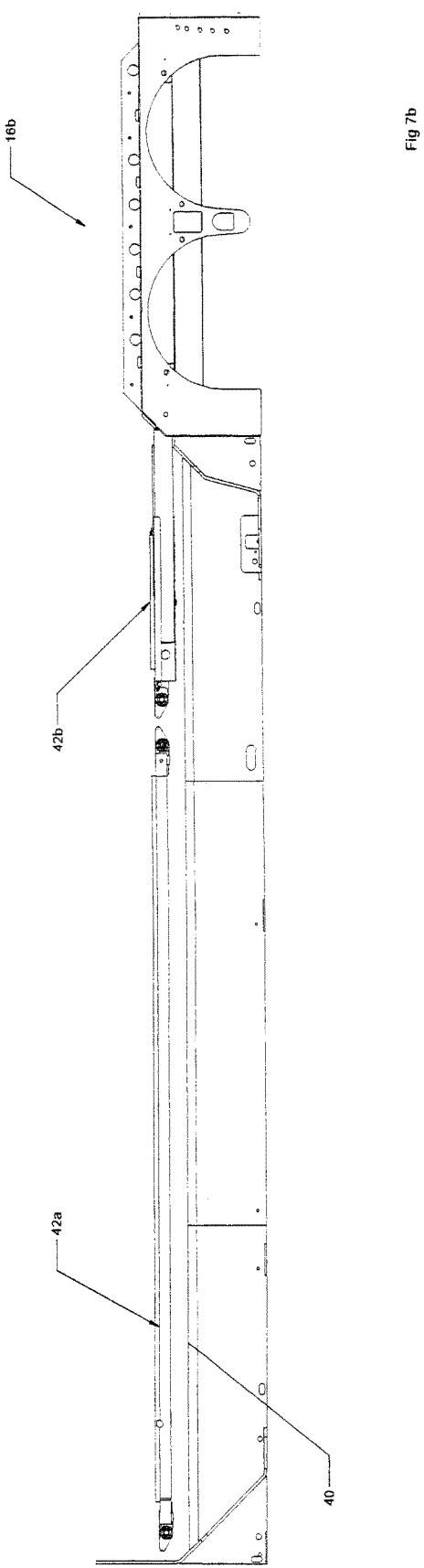

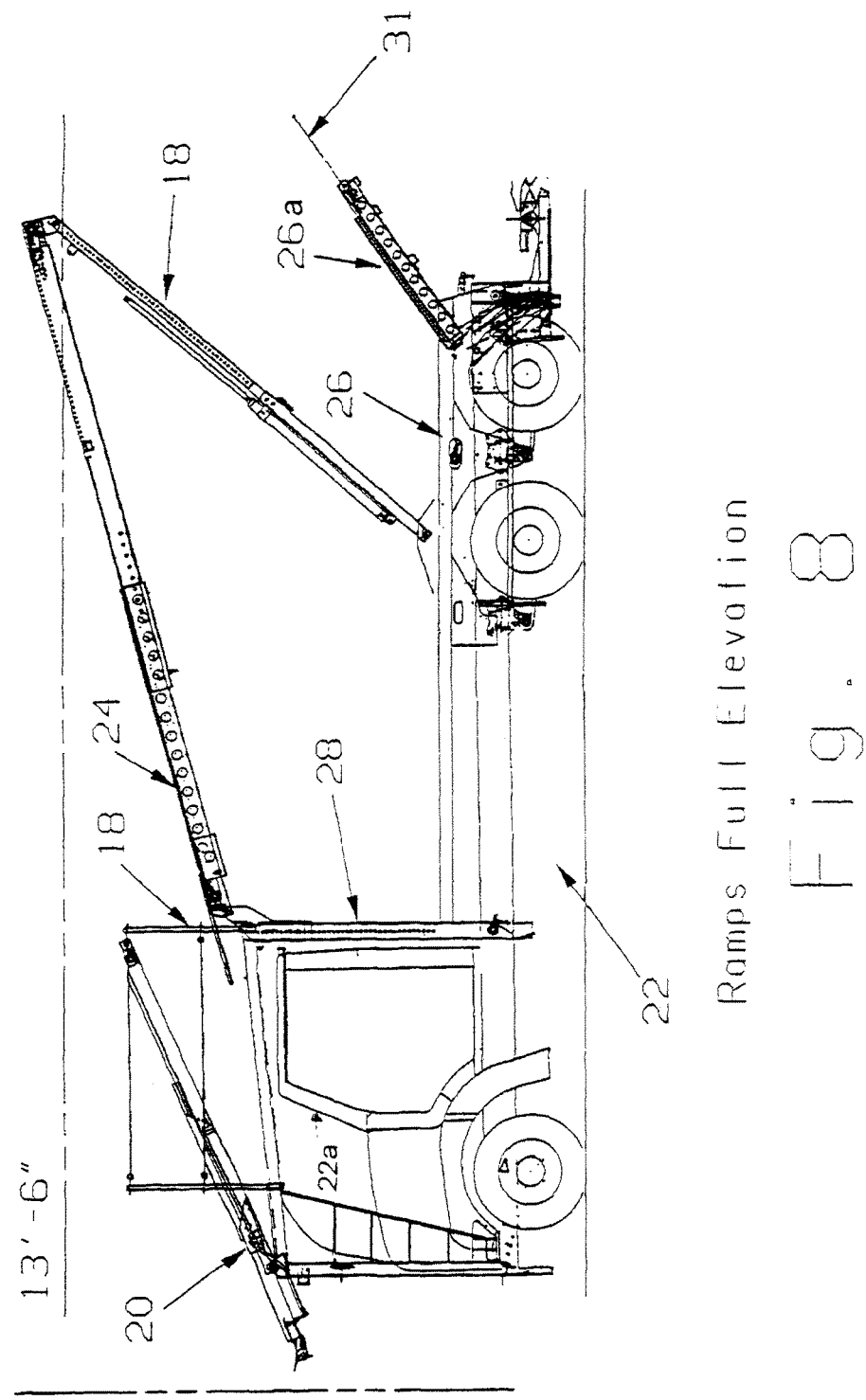

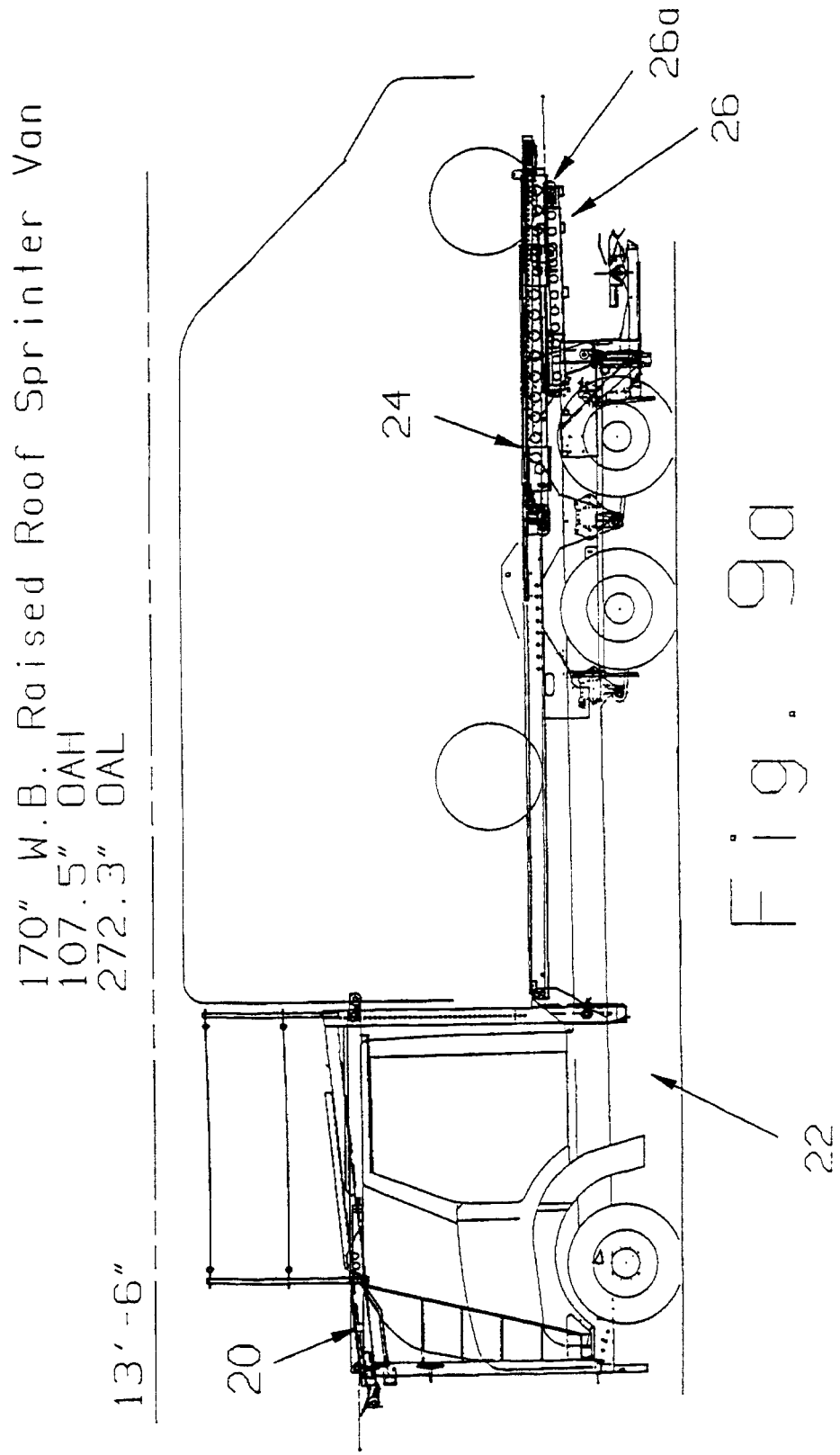

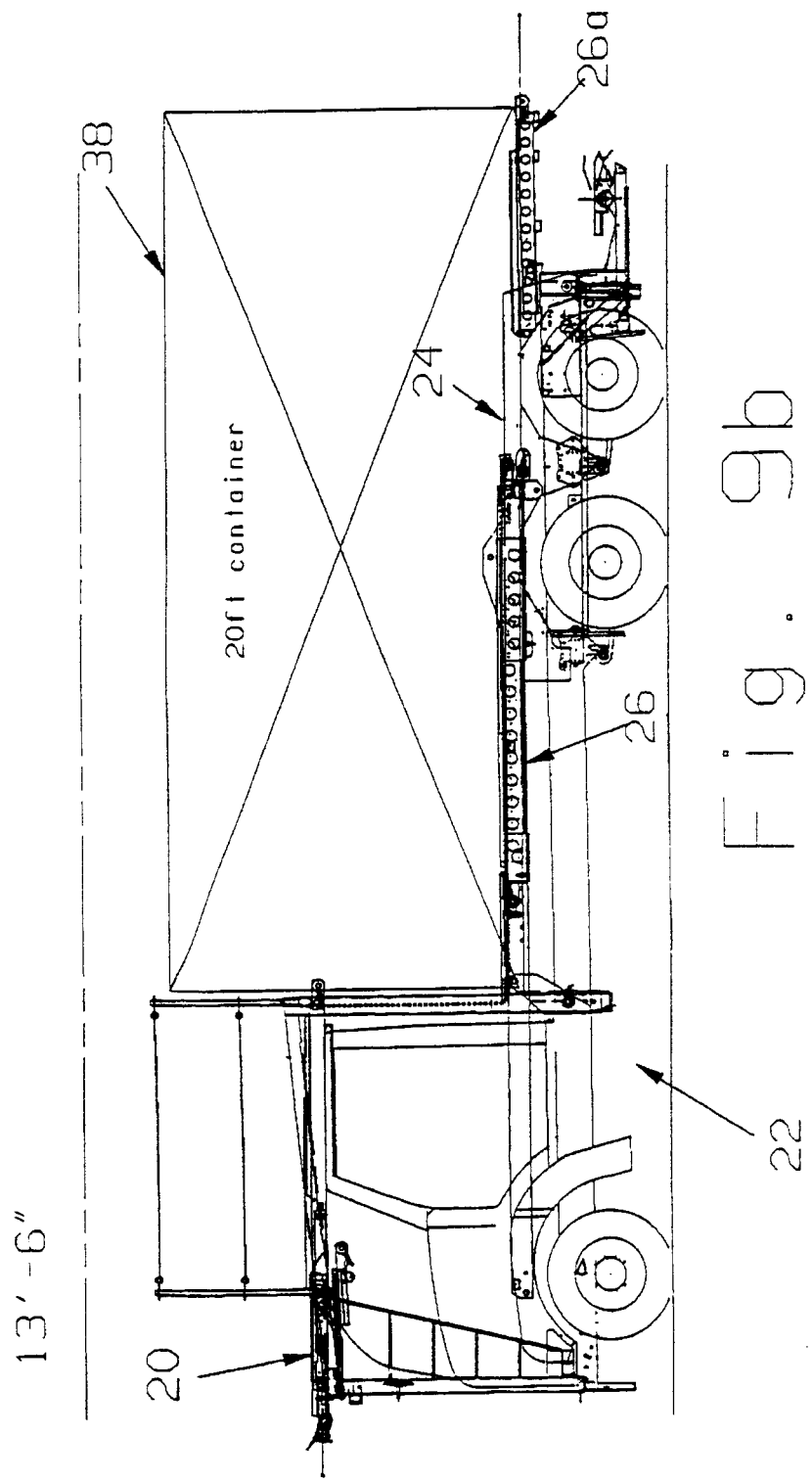

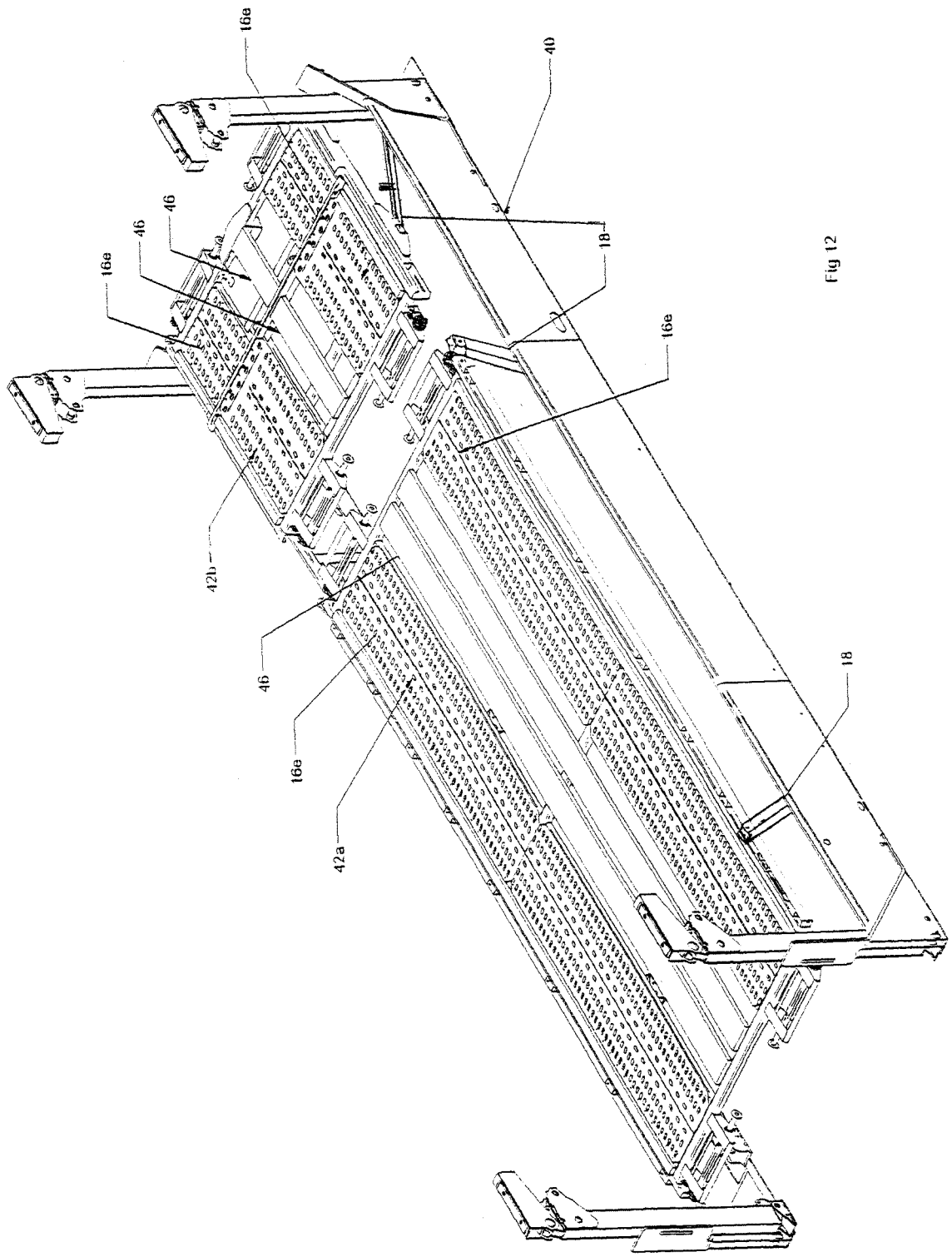

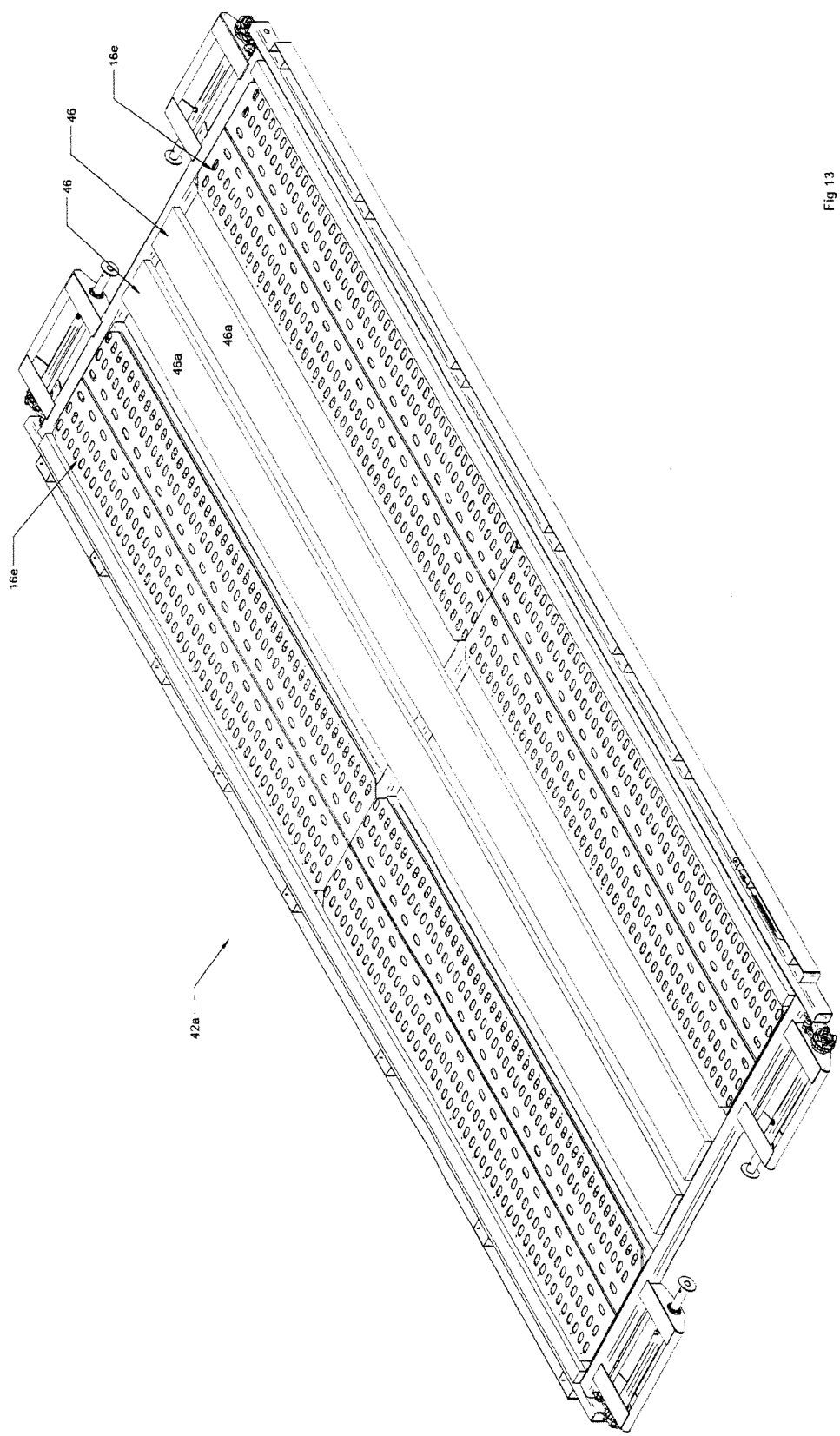

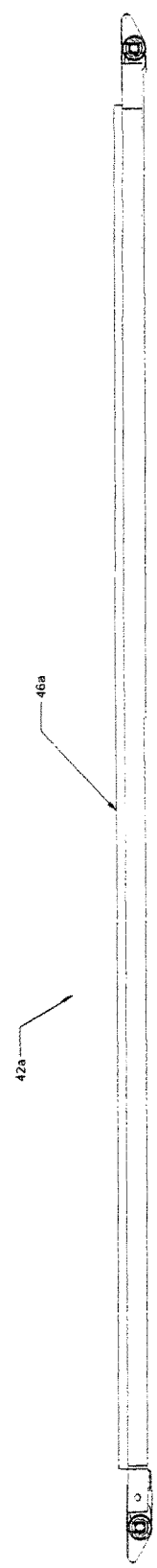

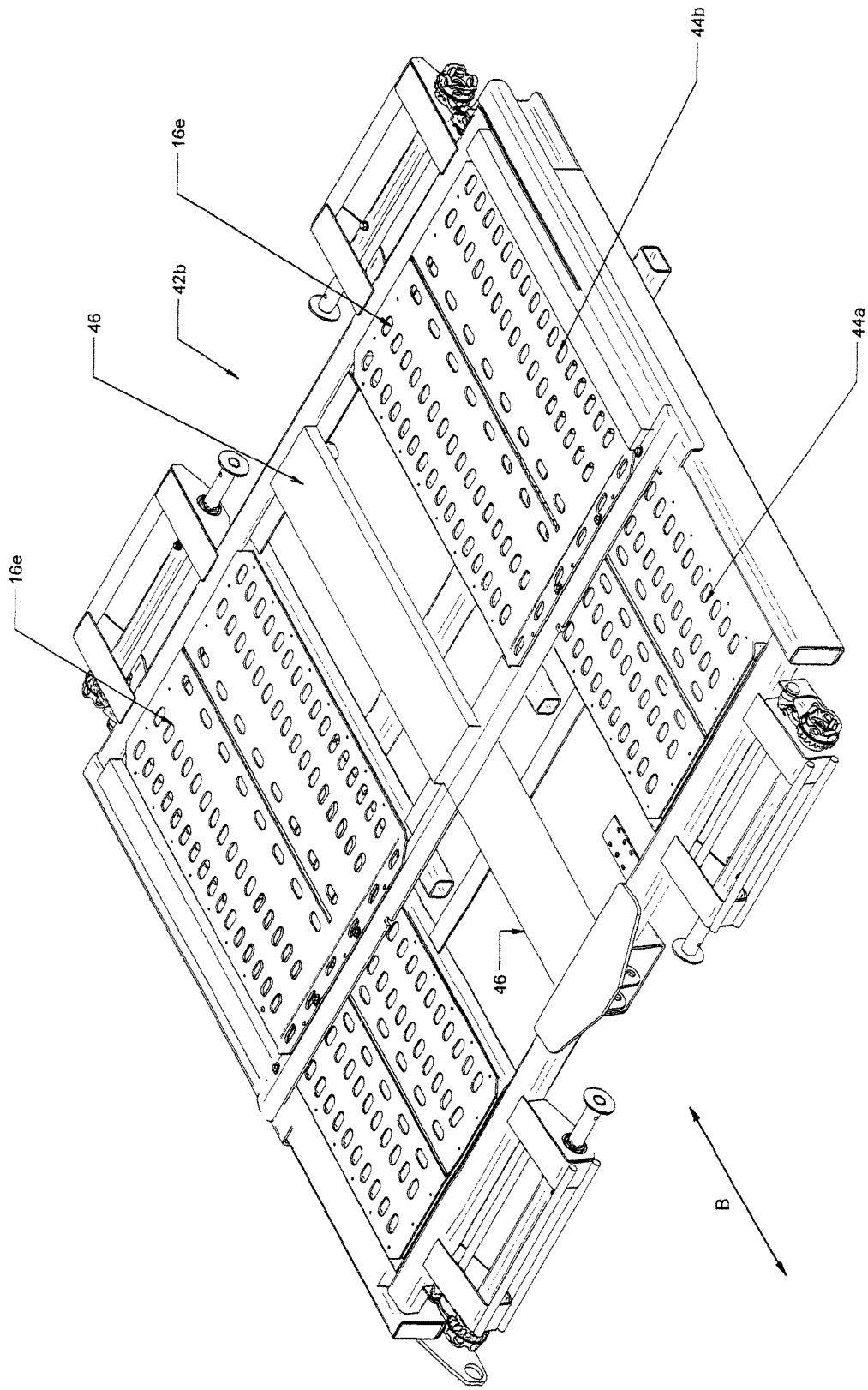

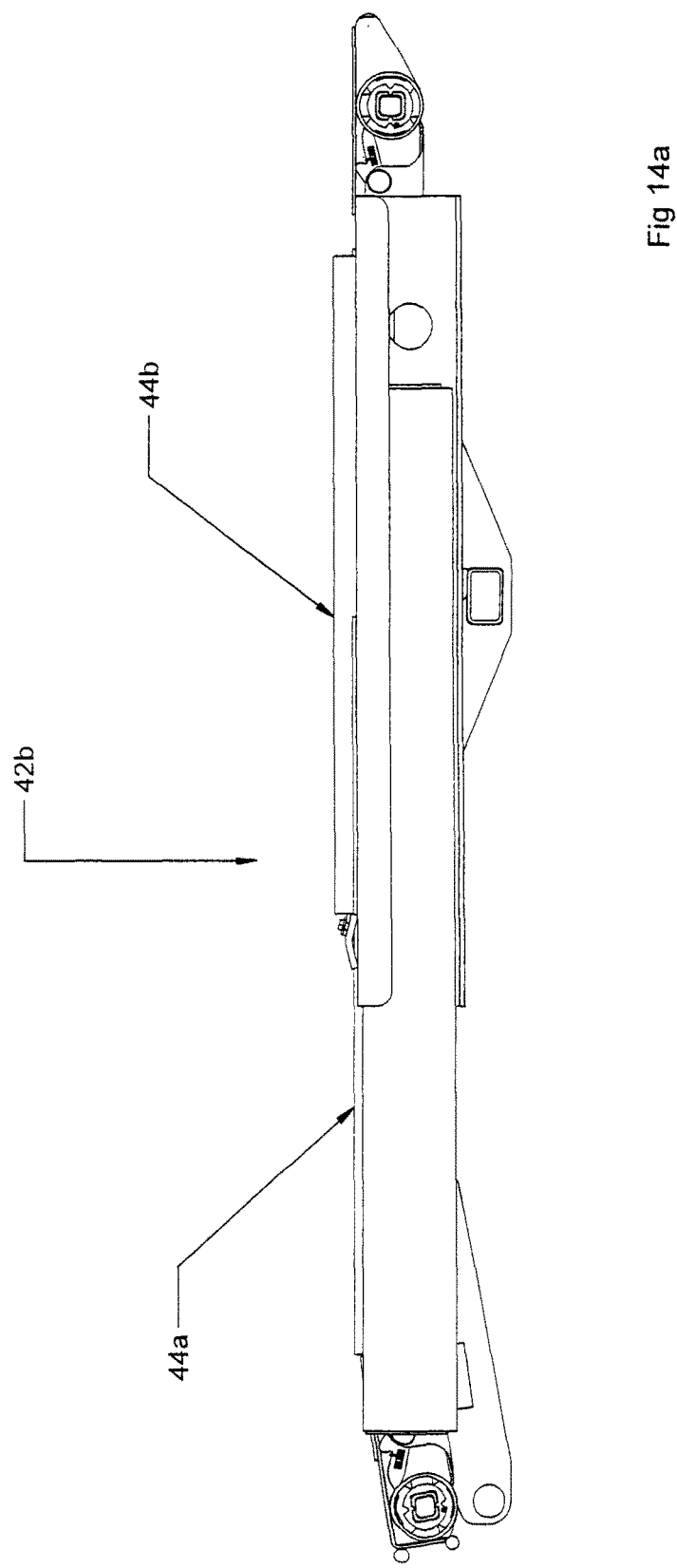

CONVERTIBLE TRAILER

FIELD OF THE INVENTION

This invention relates to the field of convertible trailers, and in particular, to a convertible trailer system allowing hybrid flexibility for loading different loads on different segments of the trailer and tractor trailer combination.

BACKGROUND OF THE INVENTION

In the prior art applicant is aware of U.S. Pat. No. 6,497,541 which issued Dec. 24, 2002 to Pawluk for a Convertible Vehicle Transporting Trailer, the entirety of which is incorporated herein by reference. In U.S. Pat. No. 6,497,541 Pawluk teaches a convertible vehicle transporting trailer has rigid upper and lower decks. The upper deck is mounted onto the lower deck by selectively actuable, releasably lockable telescopic stanchions. The stanchions are actuable by actuators so as to raise and lower the upper deck over the lower deck between a lowered position, an intermediately elevated position, and a fully elevated position. In the fully extended position the upper deck is elevated above the lower deck so as to allow loading of vehicles or freight onto the lower deck. In the intermediately elevated position the upper deck is below the fully elevated position so as to be snugly adjacent uppermost extremities of the vehicles or freight on the lower deck. In the lowered position the upper deck rests on a mid-section of the lower deck and on elevated wheel-wells of the lower deck, so that a mid-section of the upper deck is between the wheel-wells of the lower deck and a forward elevated section of the lower deck so as to be immediately above and resting on the mid-section of the lower deck.

SUMMARY OF THE INVENTION

The present invention is a convertible trailer system which in one embodiment includes a stinger steer convertible trailer and a head ramp mounted to a truck.

The trailer has a segmented lower deck, and a segmented upper deck mounted onto the lower deck by selectively actuable telescopic stanchions. The stanchions are actuable by actuators so as to raise and lower the upper deck between a lowered position, an intermediately elevated position, and a fully elevated position. In the fully extended position the upper deck is elevated above the lower deck so as to allow loading of vehicles or freight onto the lower deck. In the intermediately elevated position the upper deck is below the fully elevated position so as to be snugly adjacent uppermost extremities of the vehicles or freight on the lower deck. In the lowered position the upper deck rests on elevated wheel-wells of the lower deck. The upper deck may be horizontal, or the forward and rear portions may be inclined downwardly.

The trailer may include a spaced apart longitudinally extending parallel pair of side rails. The segmented lower deck includes a floating forward segment forward of the mid-section. The floating forward segment is independently actuable so that it may be selectively raised and lowered relative to the pair of side rails. When in the fully lowered position the forward segment is lowered to a lower extremity between the pair of side rails substantially entirely below uppermost edges of the pair of side rails. When in the elevated position the forward segment is elevated so as to be co-planar with or above the uppermost edges of the side rails whereby freight is loadable laterally, that is, sideways onto the forward segment over the pair of side rails.

The segmented lower deck may further include a floating rear segment interposed between the floating forward segment and the mid-section of the lower deck. The floating rear segment is independently actuable independently of the floating forward segment, so as to be selectively raised and lowered and inclined relative to the pair of side rails. When in the fully lowered position, the floating rear segment is lowered to a lower extremity between the pair of side rails substantially entirely below uppermost edges of the pair of side rails and substantially aligned with lower edges of the pair of side rails. When in the elevated position, the floating rear segment is selectively positionable so as to be inclined or so as to be horizontal and substantially co-planar with or above the uppermost edges of the side rails, whereby freight is loadable from a direction laterally oriented relative to the length of the trailer so as to load sideways onto the floating rear segment over the pair of side rails.

The head ramp has a lower deck and an upper deck mounted thereover. The head ramp upper deck has a vertical actuator for vertically selectively actuating the head ramp upper deck. An over-cab platform is mounted over the cab of a truck. The head ramp upper deck is elevatable into a fully raised position substantially horizontally aligned with the over-cab platform of the truck. The head ramp upper deck is positionable between a fully lowered position and the fully elevated position while remaining substantially horizontal. The head ramp upper and lower decks are stacked one over the other and extend rearwardly of the over-cab platform so that the rearmost ends of the head ramps upper and lower decks extend cantilevered over a hitch of the truck.

Bridging members are mounted so as to cooperate between the rearmost ends of the head ramp upper and lower decks and the forward-most ends of the trailer upper and lower decks to bridge between the upper and lower decks of the head ramp and trailer respectively when the upper decks of the head ramp and the trailer are substantially horizontally aligned or when the lower decks of the head ramp and the trailer are substantially horizontally aligned.

The trailer further includes a hitch coupling extending forwardly from the trailer so as to engage and mate with the hitch on the truck. Advantageously the over-cab platform is inclinable from the horizontal so as to selectively raise and lower a rear end of the over-cab platform.

Advantageously the floating rear segment is extendable in length between the mid-section of the trailer and the floating forward segment so as to lengthen when forming an inclined ramp between the mid-section and said floating forward segment. In one embodiment not-intended to be limiting the floating rear segment is telescopically extendable.

The segmented upper and lower decks include a pair of wheel-engaging members. The wheel-engaging members are parallel and laterally spaced apart and wherein the pair of wheel-engaging members are adjacent to the side rails so as to form a longitudinally extending central opening between the pair of wheel-engaging members. The central opening is adapted to support removable decking mounted therealong.

BRIEF DESCRIPTION OF THE DRAWINGS

FIG. 3a is the trailer of FIG. 3 with the lower deck fully lowered into the belly of the trailer and with the upper deck lowered down so as to be close to the top of the load on the lower deck.

FIG. 3b shows the trailer of FIG. 3 carrying a vehicle load on the upper deck instead of a container load.

FIG. 4 is, in side elevation view, the view of FIG. 3 with the over-cab deck inclined so as to carry a vehicle load with the upper deck of the head ramp elevated so as to carry a vehicle on both the upper and lower decks of the head ramp, and with the front end of the upper and lower decks of the trailer slightly lowered so as to carry a vehicle load.

FIG. 5 is the view of the trailer of FIG. 1.

FIG. 6a is the forward portion of the trailer of FIG. 6 in side elevation view.

FIGS. 7a and 7b are, respectively, the forward portion of the trailer of FIG. 7 in plan view, and side elevation view.

FIG. 8 is, in side elevation view, a further embodiment of the truck, upper deck head ramp and over-cab ramp according to the present invention with the forward over-cab ramp inclined, with the upper deck head ramp fully elevated and inclined.

FIG. 9a is the view of FIG. 9 showing a panel van loaded onto the upper deck head ramp.

FIG. 9b is the view of FIG. 9 with a twenty-foot container loaded onto the upper deck head ramps.

FIG. 12 is, in perspective view, a further embodiment of the trailer according to one aspect of the present invention, with the upper deck removed and showing the floating belly front and rear ramps of the lower deck.

FIG. 13 is, in perspective view, the floating belly front ramp of FIG. 12.

FIG. 13a is, in side elevation view, the floating belly front ramp of FIG. 13.

FIG. 14 is, in perspective view, the floating belly rear ramp of FIG. 12.

FIG. 14a is, in side elevation view, the floating belly rear ramp of FIG. 14.

DETAILED DESCRIPTION OF EMBODIMENTS OF THE INVENTION

Figure 1:
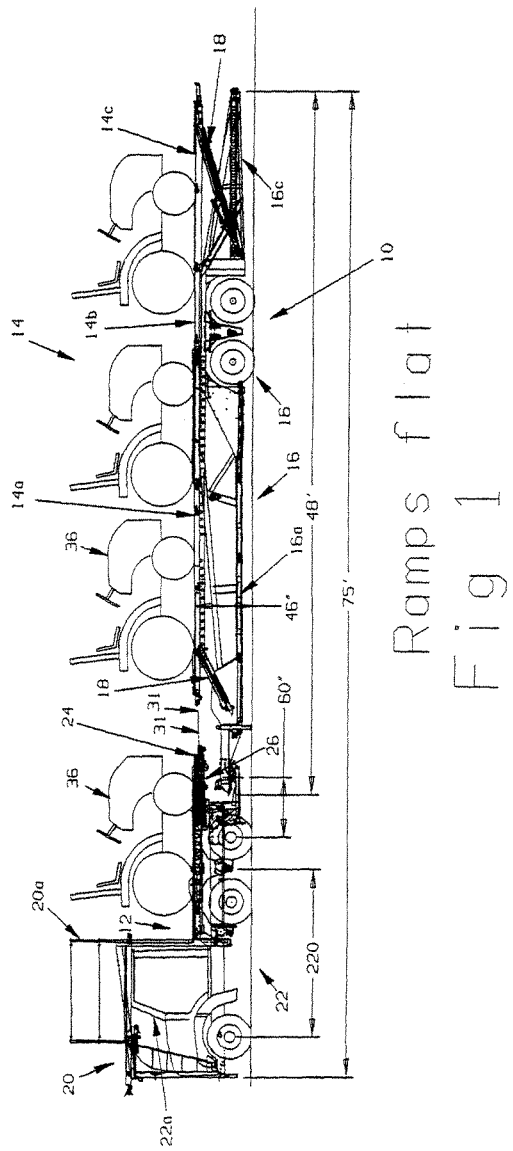
FIG. 1 is, in side elevation view, a stinger steer convertible trailer according to one embodiment of the present invention with the trailer upper and lower deck of the trailer in their fully lowered position, with the upper deck of the head ramp in its lowered position, and with all of the ramps horizontal, and shown with the trailer near-side side rail removed with a vehicle load on the head ramp and trailer upper deck.

In the figures wherein like numerals of reference denote corresponding parts in each view, the convertible trailer system according to the present invention includes a trailer, such as for example stinger trailer 10, and a head ramp 12. Trailer 10 includes an upper deck 14 and a lower deck 16. Upper deck 14 has a forward portion 14a pivotally linked to an over wheel portion 14b. An upper ramp 14c is pivotally mounted to the rear of over wheel portion 14b. Upper deck 14 is selectively raised and lowered over lower deck 16 by means of stanchions and actuators 18 using for example the lockable actuators manufactured by Delavan Industries Inc. of West Seneca, N.Y., USA. Stanchions and actuators 18 are pivotally mounted at their ends so as to extend between upper deck 14 the trailer bed. When the actuators are retracted upper deck 14 is lowered until over-wheel portion 14b rests down onto wheel well portion 16b of lower deck 16. This positions forward portion 14a substantially parallel to, and directly over, forward portion 16a of lower deck 16, and positions ramp 14c directly over lower ramp 16c. Forward portion 16a includes one or more floating belly portions, meaning deck portions that independently may be raised, lowered or inclined or maintained horizontal, for example so as to lower the forward end of forward portion 16a as seen in FIG. 4. When carrying automobiles this allows forward portion 14a to also be lowered, for example, into a position downwardly inclined so as to be substantially or somewhat parallel to the inclination of forward portion 16a thereby lowering the trailer center of gravity of the trailer load when hauling loads such as automobiles 32. Lower ramp 16c is pivotally mounted to wheel well portion 16b and may be inclined downwardly by lowering the rear most end of ramp 16c to thereagain lower the center of gravity and to provide a loading ramp. Upper ramp 14c may be also be inclined downwardly to assist in loading and also to lower the center of gravity of a load such as a vehicle being carried on upper ramp 14c.

An over-cab ramp 20 having a safety railing 20a is mounted directly over truck 22 and in particular over truck cab 22a. Actuators and stanchions 18 mounted under over-cab ramp 20 allow ramp 20 to be inclined by raising of its rear end. Head ramp 12 is mounted behind cab 22a and includes an upper deck 24 and a lower deck 26. Upper deck 24 may be raised directly over lower deck 26 by means of a vertical actuator 28 mounted vertically, directly behind truck cab 22a, and by means of stanchions and actuators 18 pivotally mounted at their upper and lower ends so as to extend diagonally between respectively upper deck 24, when raised and lower deck 26. Actuation of the actuators results in raising and lowering upper deck 24 in direction C and also provides for inclining of upper deck 24 as seen in FIG. 8. Bridges 31 are mounted to the forward ends of upper or lower decks 14 and 16 or to the rearmost ends of upper or lower decks 24 and 26, or some combination thereof so that when the lower decks 16, 26 are horizontally aligned or when the upper decks 14, 24 are horizontally aligned, loads such as vehicles may travel or be transported across the bridges from one upper deck to another, and from one lower deck to another. A head ramp lower deck extension 26a may be stored in an upwardly inclined position, or may be lowered when loading the lowered deck 26 and to help carry longer loads on the head ramp.

By the various positioning of over-cab ramp 20, head ramp upper deck 24, and trailer upper deck 14 various combinations of loads may be accommodated as will be appreciated by one skilled in the art reviewing the combination of loads illustrated by way of example in the accompanying Figures and as described herein.

Thus, with the decks oriented as shown in FIG. 4 the number of vehicles that may be carried at one time is optimized and the center of gravity of the load and trailer lowered as much as possible. When loading vehicles such as automobiles 32 or tractors 36, the upper decks are lowered and the vehicles are driven onto the upper decks. The upper decks are then elevated to their full height. This aligns forward portion 14a with head ramp upper deck 24 when in its fully elevated position, that is, when upper deck 24 is elevated so as to be co-planar with over-cab ramp 20.

The forward-most vehicle on forward portion 14a is then driven onto upper deck 24 and from there onto over-cab ramp 20. Another vehicle may then be driven from forward portion 14a onto upper deck 24. With over-cab ramp 20 then inclined so as to elevate the end of the vehicle being carried on over-cab ramp 20 adjacent upper deck 24, the vehicle next driven onto upper deck 24 may be positioned with its bumper underneath the elevated end of the vehicle being carried on over-cab ramp 20. Upper deck 14 is then lowered to take on two more vehicles, ramp 14c being lowered to accommodate loading of the vehicles. Ramp 14c is then raised to the horizontal once the last vehicle has been loaded onto upper deck 14.

Upper deck 14 may then be again elevated to its full elevation and the loading of vehicles onto lower deck 16 and lower deck 26 may commence. Vehicles are then driven onto the lower decks. Once the vehicles are secured on the lower decks the upper decks are lowered into positions snugly over the vehicles on the lower decks. The forward portions 14a and 16a may be inclined downwardly. Ramp 16c is elevated from contact with the ground.

Figure 2:
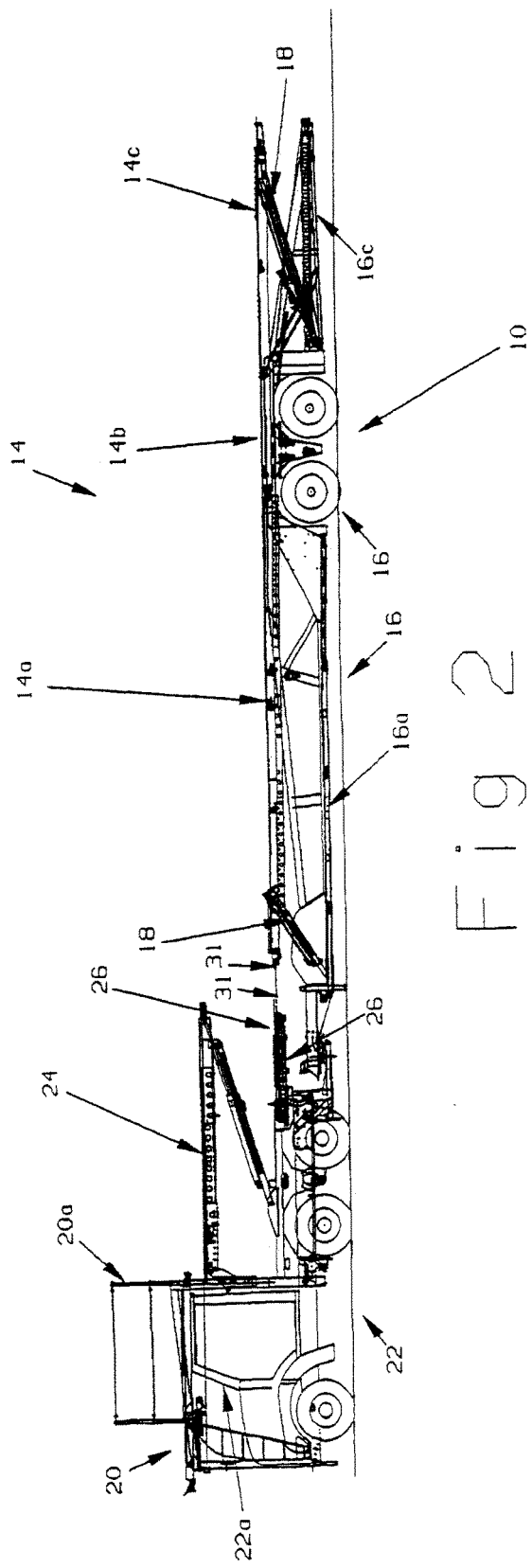
FIG. 2 is, in side elevation view, the view of FIG. 1 with the load removed and with the upper deck of the head ramp being elevated.

Keeping in mind the height restrictions restricting the overall height of the truck cab and load on over-cab ramp 20, instead of carrying vehicles a pallet load 34 may be placed on over-cab ramp 20 using a forklift. Vehicle loads such as for example tractors 36 or automobiles 32 may then be loaded onto upper deck 24. Depending on the height of the vehicle load, and without exceeding the overall height restrictions, a further load for example pallet loads 34 may be simultaneously carried on lower deck 26. Pallet loads 34 may be loaded on lower deck 26 by rear and side loading onto deck 26 using a forklift. A 40 foot long container load (not shown) may also be carried on upper deck 14. Again, pallet loads 34 may be carried underneath the container load. Pallet loads 34 carried on both lower deck 26 and lower deck 16 may be quickly side-loaded that is loaded traversely, onto the upper and lower decks. That is, with upper deck 14 horizontal and in its lowered position as seen in FIG. 2, pallets 34 may be easily loaded onto upper deck 14 from alongside the trailer thereby effectively increasing the carrying capacity of the trailer in its flat-deck mode. The effect of increasing the load capacity means that pallet loads which before would be carried on many more feet of flat-deck can now be carried on the 40 feet of flat-deck on upper deck 14, and additionally further pallets carried on the lower deck 16 effectively make the trailer equivalent to a much longer conventional flat bed trailer.

In a preferred embodiment, the trailer, such as stinger steer convertible trailer 10, provides a floating-belly style lower deck as better described below for side loading by forklifts while also providing a hybrid flexibility for loading and carrying different kinds of loads in various combinations to optimize lowering the center of gravity of the load and trailer combination where possible. Combinations may include carrying automobiles and pallets, or pallets combined with larger loads including containerized loads, subject and pallets to highway height and length restrictions. The various loads may be also mixed between loads carried on the head ramp and loads carried on the trailer.

Figure 3:
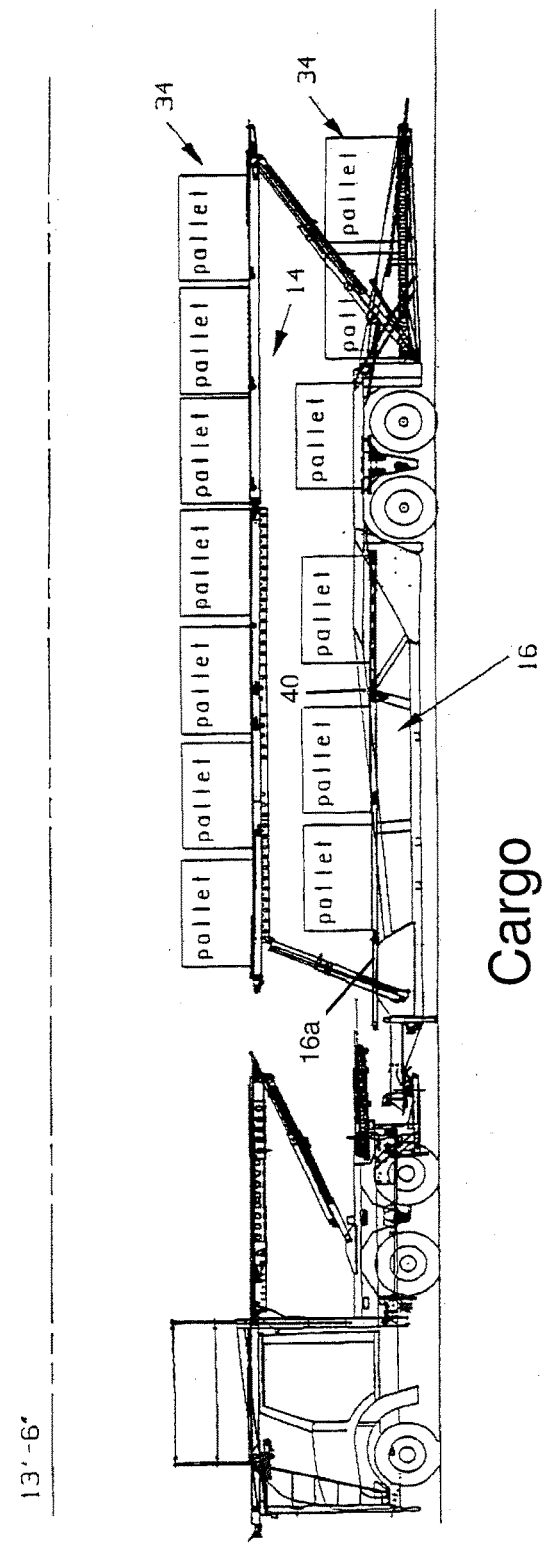
FIG. 3 is, in side elevation view, the trailer of FIG. 1 with the head ramp and trailer upper deck elevated and horizontal so as to carry pallet loads on the upper decks and pallet loads on the lower decks.
Figure 6:
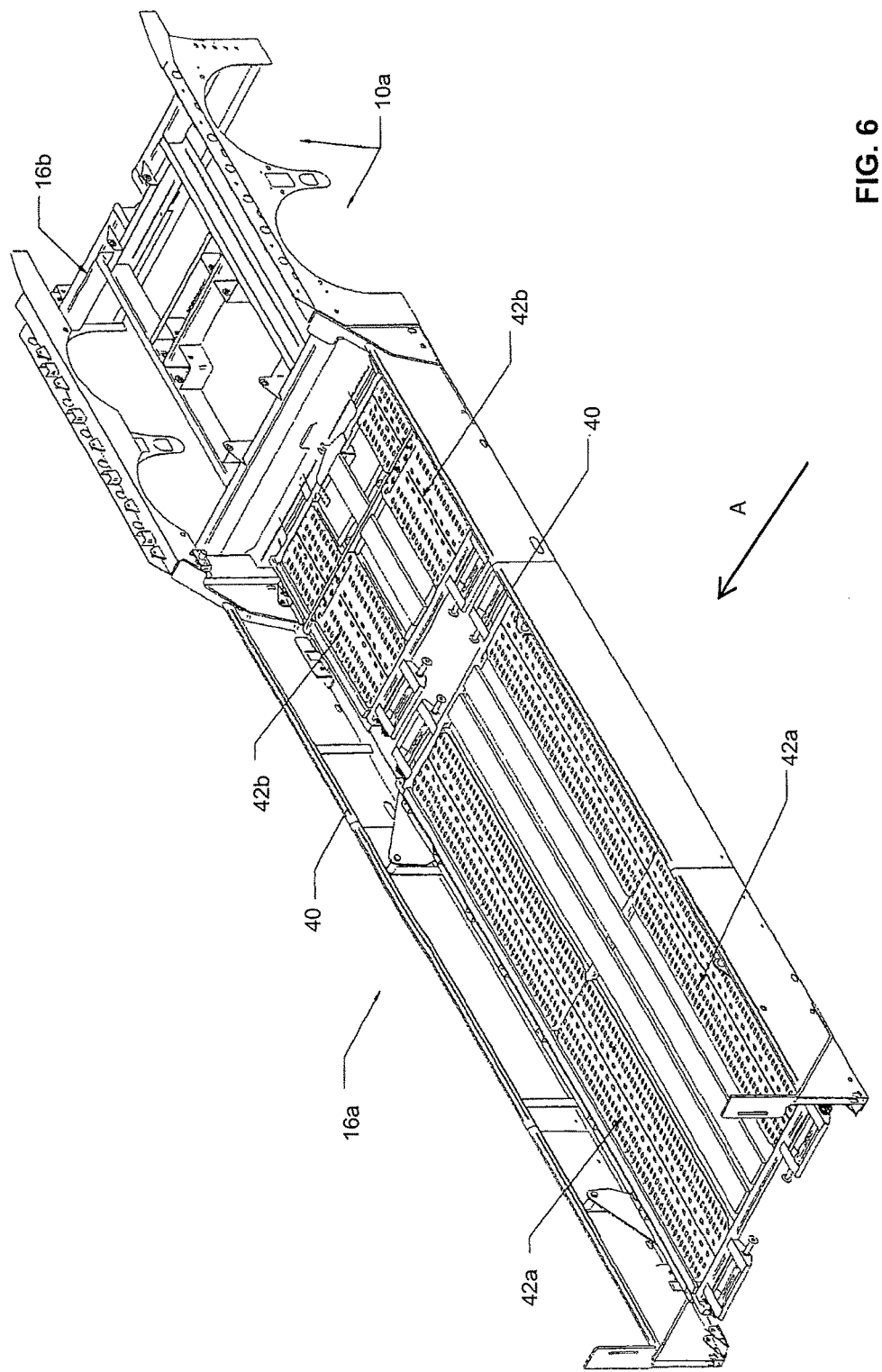
FIG. 6 is, in partially cutaway perspective view, the forward portion and wheel well portion of the lower deck of the trailer with the floating belly ramps of the forward portion of the trailer fully lowered and horizontal.

In the embodiment of FIG. 4, forward portion 16a of lower deck 16 is shown as a single pair of ramps extending from the front of the trailer back to the tandem wheel wells, in the fully lowered position of FIG. 3a, forward portion 16a is flat and lowered between the side rails 40 into a position corresponding to that shown in FIG. 6. Forward portion 16a may be elevated while remaining horizontal from its fully lowered position, to its fully raised position such as seen in FIG. 3 where forward portion 16a is elevated above the upper edges of side rails 40. This allows pallets 34 to be side loaded, that is, loaded laterally in direction A or sideways relative to the trailer directly onto the wheel-engaging members 16e of forward portion 16a or onto planking 46 in the further embodiment described below and shown in FIG. 12 onward. Where it is desired to carry a load of vehicles on lower deck 16, as seen in FIG. 4, forward portion 16a may have its forward end lowered and its rear end elevated to the level of wheel well portion 16b which extends over the tandem wheel wells 10a.

Figure 7:
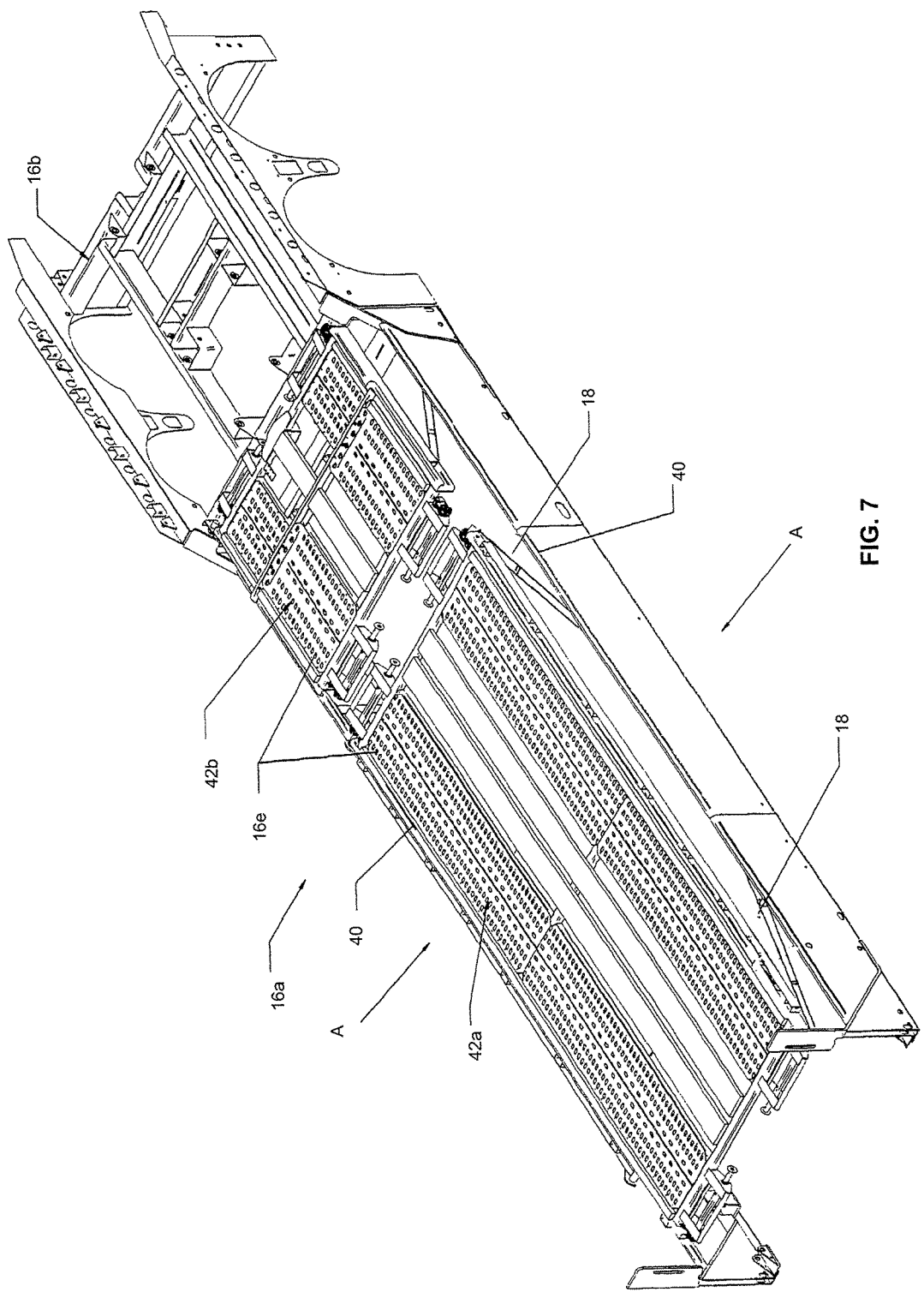
FIG. 7 is the trailer of FIG. 6 with the floating belly ramps fully elevated and horizontal above the side rails of the forward portion of the trailer.
Figure 7A:
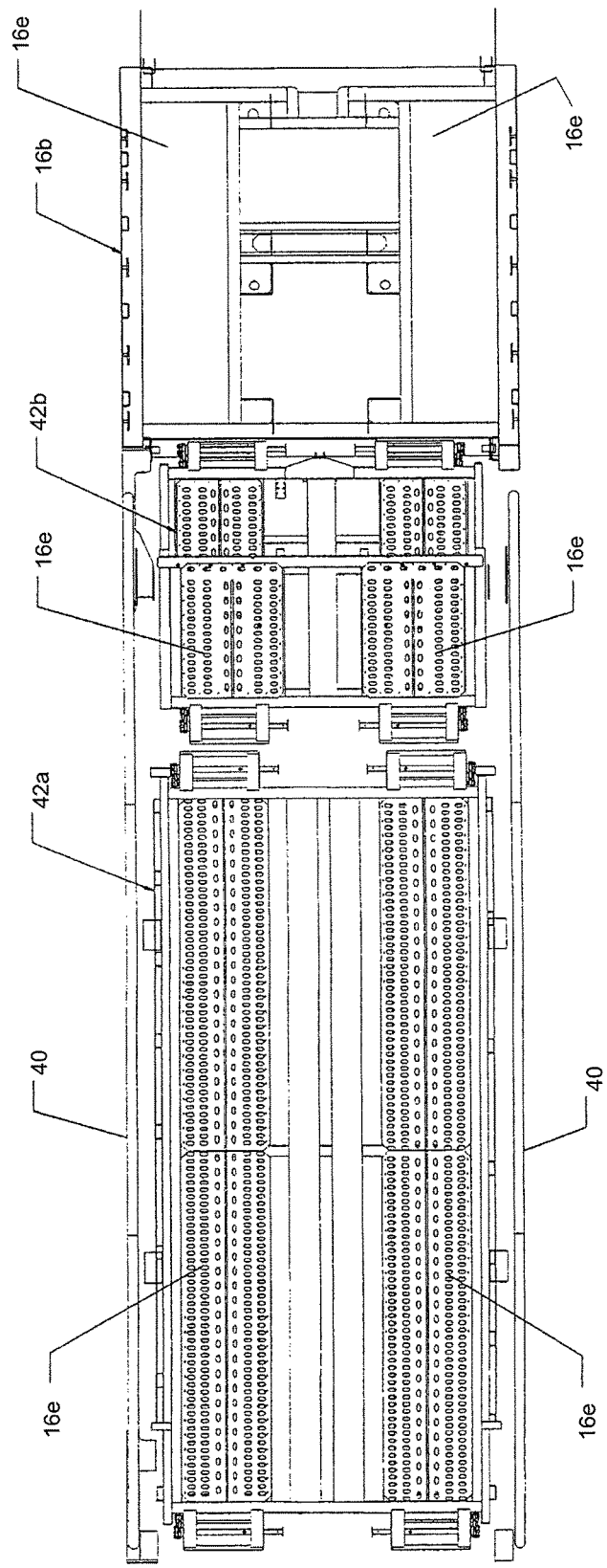

In the embodiment of FIGS. 6 and 7, forward portion 16a of lower deck 16 includes a floating belly front ramp 42a and a floating belly rear ramp 42b. The forward edge of floating belly rear ramp 42b is adjacent to the rear end of floating belly front ramp 42a. The rear end of floating belly rear ramp 42b is adjacent the forward end of wheel well portion 16b and wheel wells 10a. The forward end of floating belly front ramp 42a is adjacent the front ends of side rails 40. Actuators and Stanchions 18 are provided under floating belly front and rear ramps 42a and 42b so that floating belly front and rear ramps 42a and 42b may be independently raised and lowered relative to side rails 40 while remaining horizontal or inclined, and may be independently inclined relative to one another.

This embodiment allows for further flexibility in the hybrid approach according to the present invention in carrying mixed loads of for example vehicles, pallets, and containers of various sizes. Thus for example, it may be desirable to transport palletized goods or pallets 34 in a horizontal position. In order to maximize the number of pallets that may be carried, floating belly front end rear ramps 42a and 42b are side loaded in direction A while in their fully elevated positions such as seen in FIG. 3 and, once loaded, lowered while remaining horizontal into the fully lowered and horizontal position as seen in FIG. 3a. Once the pallets on the lower deck have been lowered fully into the belly of the trailer, the upper deck 14 containing its load of a container or containers or pallets or vehicles is then lowered down so as to be snugly over the load of pallets on the lower deck. Depending on the vertical height of the load carried on upper deck 14, and given the overall height restriction governing the transportation of freight or automobiles as the case may be on regulated roadways, and depending on the height of the palletized loads it may be that a further pallet may be carried on wheel well portion 16b such as seen in FIG. 3, or, in order to allow the upper deck 14 to be lowered as much as possible as seen in FIG. 3a, no pallet may be carried on wheel well portion 16b.

Where instead of carrying pallets on lower deck 16, vehicles are to be loaded, then the floating belly front and rear ramps 42a and 42b may be inclined so as to emulate for example the inclined forward portion 14a as seen in FIG. 4 to enable an automobile to be carried on wheel well portion 16b with the front wheels of the automobile on forward portion 16a. As would be known to one skilled in the art of carrying automobiles, because the clearance under the automobiles is very limited the angles of inclination that may be accommodated by a vehicle being parked partially on a horizontal ramp and partially on an inclined ramp is very restricted. Thus the inclined ramps have to be relatively gently inclined, depending on the type of vehicle being carried.

As seen in FIGS. 3a and 3b, lower ramp 16c is also fully articulated like floating belly rear ramp 42b. That is, lower ramp 16c is mounted on stanchions/actuators 18 so that it may be elevated to be horizontal and substantially co-planar with wheel well portion 16b, and may be inclined rearwardly from that position to load and carrying vehicles such as automobiles 32 as seen in FIG. 4, and may be fully lowered so as to be horizontal and substantially co-planar with forward portion 16a of lower deck 16 when in its fully lowered position in the belly of the trailer. Thus the articulation of ramp 16c allows carrying horizontally thereon loads such as pallets 34 while maximizing the height of the load that may be carried under the upper deck and in particular under upper ramp 14c.

In FIG. 3, pallets 34 have been loaded onto upper deck 14 while the upper deck was fully lowered such as in FIG. 2 loading may be done by forklifts or the like side loading in direction A. Upper deck 14 may then be elevated to provide access to lower deck 16. Lower deck 16 has been elevated above side rails 40, for example so as to be at the same elevation as the upper surface of wheel well portion 16b. Pallets 34 have been side loaded in direction A onto lower deck 16 such as seen in FIG. 3, and in particular onto the floating belly front and rear ramps 42a and 42b of the forward portion 14a. Pallets 34 so loaded on to upper and lower decks 14 and 16 are lowered to, firstly, settle the lower deck down into the belly of the trailer, and, secondly, to snug the upper deck down onto the lower deck load as much as possible to lower the center of gravity of the upper deck load. Thus, in FIG. 3a no pallet or pallets are carried on wheel well portion 16b so that upper deck 14 may be lowered as much as possible while still allowing carrying of a substantial number of pallets on lower deck 16.

Figure 12A:
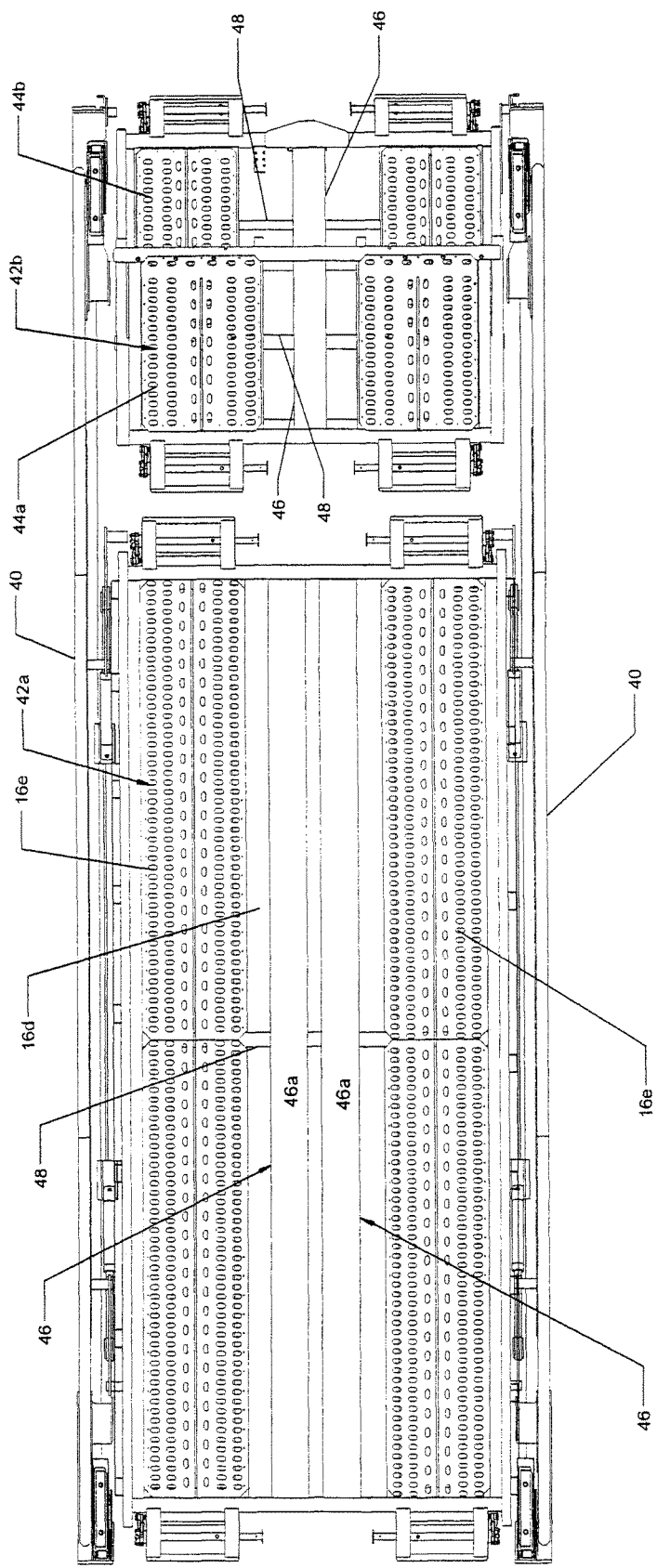
FIG. 12a, is, in plan view, the view of FIG. 12.
Figure 12B:
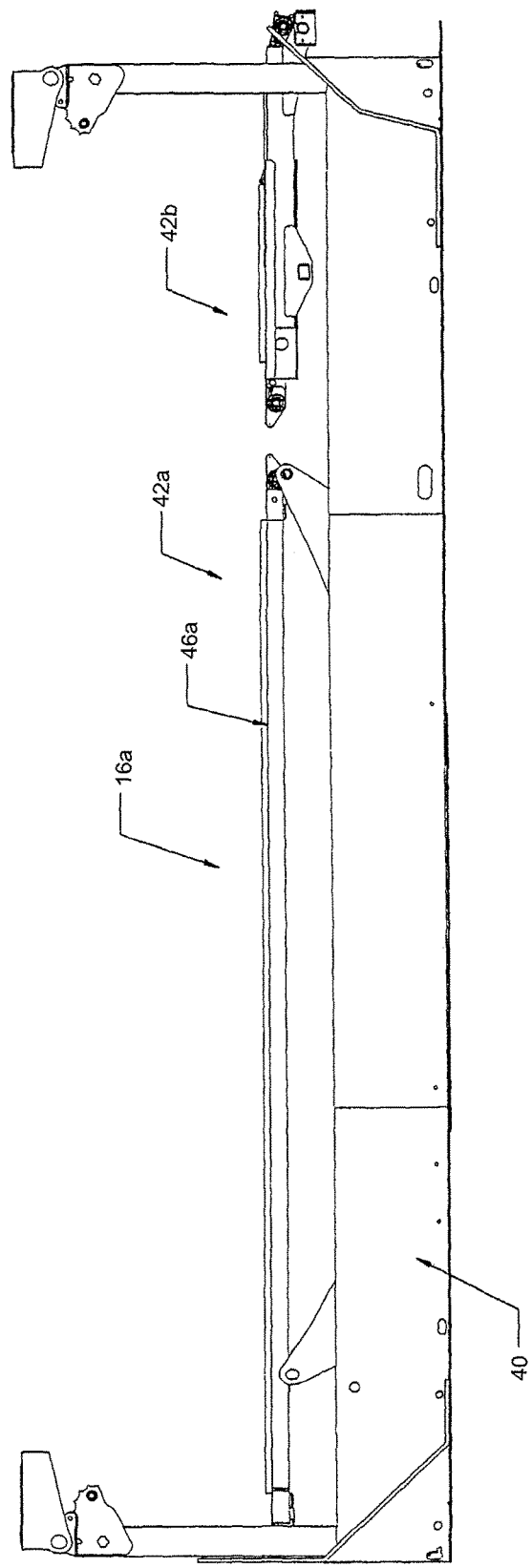
FIG. 12b is, side elevation view, the view of FIG. 12.

As seen most clearly in FIGS. 12-14, floating belly front and rear ramps 42a and 42b are carried on, and actuated independently on their associated actuators and stanchions 18. Thus floating belly front ramp 42a and floating belly rear ramp 42b may be independently raised, lowered, and inclined relative to each other. When for example floating belly front ramp 42a is fully lowered down into the belly of the trailer, that is, between side rails 40 to the lower-most extremity between the side rails as permitted by the stanchions and actuators 18, if a particular load requires that floating belly rear ramp 42b be inclined so as to provide a ramp between front ramp 42a and wheel well portion 16b, rear ramp 42b may be inclined and lengthened telescopically as for example best seen in FIGS. 14 and 14a by the sliding of ramp section 44a out from underneath ramp section 44b in direction B. Thus floating belly rear ramp 42b may be shortened or lengthened so as to translate the front end of ramp section 44a forwardly or rearwardly to remain consistently adjacent to the rear end of floating belly front ramp 42a. Thus, when horizontal, floating belly rear ramp 42b will have the shortest combined length between ramp sections 44a and 44b, as for example seen in FIGS. 12, 12a and 12b. When inclined however such as seen for example in FIG. 4, ramp sections 44a and 44b will be telescopically translated relative to one another to lengthen rear ramp 42b so as to nearly abut the front end of ramp section 44a against the rear end of floating belly front ramp 42a. The continuously adjustable length of floating belly rear ramp 42b accommodates the various inclinations that may be desirable for the front and rear ramps 42a and 42b depending on the load being carried.

As also seen in FIGS. 12, 13 and 14, advantageously planking 46, which is understood to include not only wood planking but also planking of other materials or other removable decking, panels or sections, are removably installed at least in and along the open central corridors 14d and 16d in the gap between the pairs of parallel wheel engaging members 14e and 16e on which vehicles are driven (so that their tires roll along the ramp members 14e and 16e). Planking 46 so installed, and preferably removably installed along the central corridors 14d, 16d, substantially provide a decking or sheeting over the larger openings on the upper and lower decks to assist in the carrying of for example pallets 34. In particular, advantageously the upper surfaces 46a of planking 46 are raised at least slightly above the corresponding upper surfaces of wheel engaging members 14e and 16e so that when pallets 34 are deposited during loading down onto the upper and lower decks, the bottom of the pallets, which typically are of wood, rest on upper surfaces 46a instead of resting on the metal of wheel engaging members 14e, 16e. Planking 46 thus provides increased friction between the decks and the undersides of the pallets to inhibit slipping of the loads during transport.

In the embodiment illustrated, cross members 48 span laterally across and between the members 14e, 16e so as to support the undersides of planking 46. The arrangement of cross members 48 is not intended to be limiting as longitudinally extending rigid members may also be employed, whether they are beams or channels or the like. Further, in some embodiments of trailers 10, there may be side gaps formed between the laterally outer side edges of members 14e, 16e and the corresponding side rails 40, which gaps may also be sheeted with planking to cover the side gaps.

Although limited embodiments of stanchions and actuators 18 are illustrated, it will be understood to those skilled in the art, that various actuation assemblies and systems may be employed to selectively raise, lower, and incline the upper and lower decks 14, 16 and in particular in the lower deck 16 the forward and rear floating bellies 42a, 42b without departing from the scope of the present invention. It will also be understood by those skilled in the art how to provide the hydraulic actuation systems corresponding to the actuators and stanchions 18 and how to pivotally mount the ends thereof to the side rails or other trailer structure and to the upper and lower deck structure so that the upper and lower decks 14, 16 and in particular the forward and rear floating belly ramps 42a, 42b may be smoothly and stably actuated and locked in their desired positions so as to attain the desired orientations of the upper and lower decks, and within the lower deck the desired orientations of the floating belly front and rear ramps.

Figure 9:
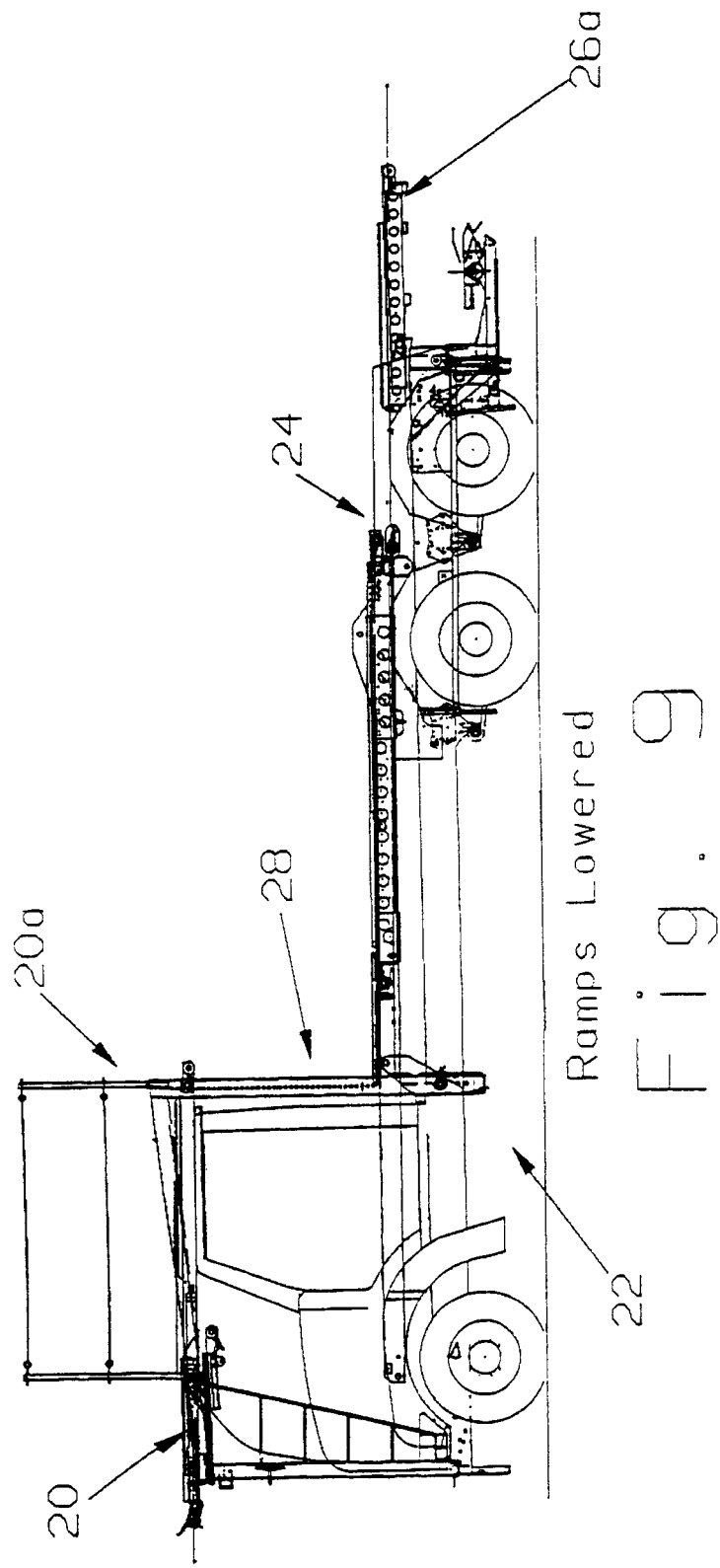
FIG. 9 is, the truck of FIG. 8 with the over-cab ramp lowered to horizontal, and with the upper deck head ramp fully lowered and horizontal.
Figure 10:
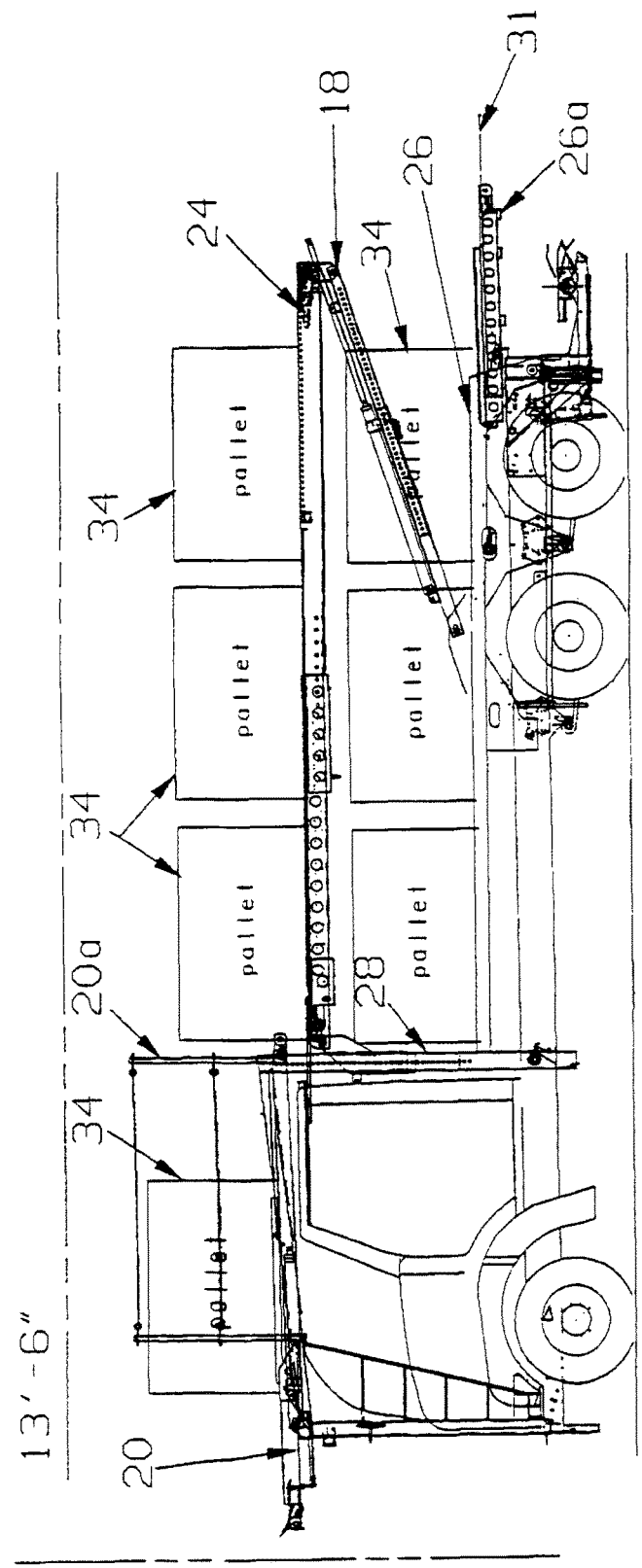
FIG. 10 is, in side elevation view, the truck of FIG. 8 with the over-cab ramp lowered to horizontal, and with the head ramp upper deck elevated to substantially the elevation of the over-cab ramp and horizontal showing a load of pallets carried on the over-cab ramp, the head ramp upper deck and the head ramp lower deck.
Figure 11:
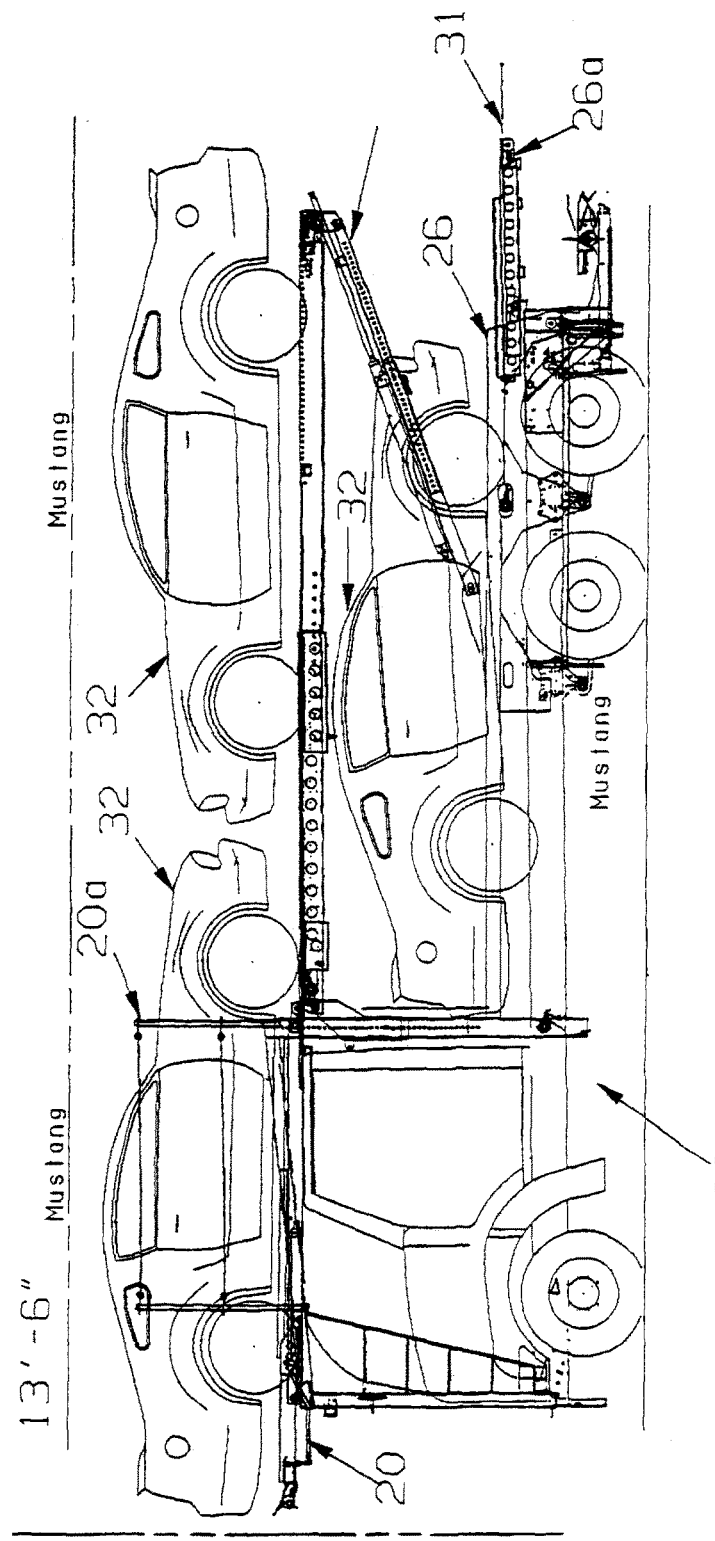
FIG. 11 is the truck of FIG. 10 with vehicles loaded on the over-cab ramp, the upper deck of the head ramp, and the lower deck of the head ramp.

As seen in FIGS. 8-11, in a further embodiment of truck 22, the head ramp upper deck may have a forward and rear portion which may be independently articulated. Thus the forward ramp 24a of head ramp upper deck 24 may be independently elevated and inclined, independently of rear ramp 24*b*. This combined with the ability of over-cab ramp 20 to incline, the combination of over-cab ramp 20, and front and rear ramps 24*a* and 24*b* of head ramp upper deck 24 may be combined to carry various loads. Thus for example, a loading of pallets may be carried as seen in FIG. 10 wherein the upper decks of the head ramp and the over-cab ramp are substantially co-planar and horizontal. This provides room on the lower deck of the head ramp to also carry further pallets. As seen in FIG. 11, over-cab ramp 20 may be inclined to accommodate carrying a vehicle and allowing a further vehicle to be carried on the forward and rear ramps of the head ramp upper deck while allowing room to carry a further vehicle on the head ramp lower deck.

With the forward and rear ramps of the head ramp upper deck in their fully lowered position such as seen in FIG. 9, loads such as the panel van of FIG. 9*a* and the twenty-foot container of FIG. 9*b* may be accommodated on the head ramp while still allowing a load to be carried on the over cab ramp.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A convertible trailer system comprising:
a convertible trailer having a segmented lower deck, a segmented upper deck mounted onto said lower deck by selectively actuable telescopic stanchions, said stanchions actuable by actuators so as to raise and lower said upper deck over said lower deck between a lowered position, an intermediately elevated position, and a fully elevated position, wherein in said fully elevated position said upper deck is elevated above said lower deck so as to allow loading of vehicles or freight onto said lower deck, wherein in said intermediately elevated position said upper deck is below said fully elevated position so as to be snugly adjacent uppermost extremities of said vehicles or freight on said lower deck, wherein in said lowered position said upper deck rests on a mid-section of said lower deck and on elevated wheel-wells of said lower deck,
wherein said trailer includes a spaced apart longitudinally extending parallel pair of side rails and wherein said segmented lower deck includes a floating forward segment forward of said mid-section and independently actuable so as to be selectively raised and lowered relative to said pair of side rails, and wherein when in said fully lowered position said forward segment is lowered to a lower extremity between said pair of side rails substantially entirely below uppermost edges of said pair of side rails, and
wherein when in said elevated position said forward segment is elevated so as to be co-planar with or above said uppermost edges of said side rails whereby freight is loadable laterally sideways onto said forward segment over said pair of side rails,
wherein said forward segment is a floating forward segment and wherein said segmented lower deck further includes a floating rear segment interposed between said floating forward segment and said mid-section of said lower deck, said floating rear segment independently actuable so as to be selectively raised and lowered and inclined relative to said pair of side rails and independently of said floating forward segment, and wherein, when in said fully lowered position, said floating rear segment is lowered to a lower extremity between said pair of side rails entirely below uppermost edges of said pair of side rails and substantially aligned with lower edges of said pair of side rails,
and wherein, when in said elevated position, said floating rear segment selectively positionable so as to be inclined or so as to be to horizontal and substantially co-planar with or above said uppermost edges of said side rails, whereby freight is loadable from a direction laterally oriented relative to the length of said trailer so as to load sideways onto said floating rear segment over said pair of side rails,
and wherein said segmented lower deck further includes a lower pair of wheel-engaging members, and wherein said pair of wheel-engaging members are parallel and laterally spaced apart and wherein said pair of wheel-engaging members are adjacent to said side rails of said pair of side rails so as to form a longitudinally extending central opening between said pair of wheel-engaging members,
and wherein said central opening is adapted to support removable decking mounted therealong,
and wherein said segmented lower deck further includes removable decking mountable in a central opening in said segmented lower deck to form a substantially solid continuous floor over said central opening,
and wherein said decking has an upper surface which, when said decking is mounted in said central opening is raised slightly above an upper surface of said wheel-engaging members.

2. The system of claim 1 further comprising:
a head ramp having a lower deck and an upper deck mounted thereover, said head ramp upper deck having a vertical actuator for vertically selectively actuating said head ramp upper deck, an over-cab platform mountable over the cab of a truck, said head ramp upper deck elevatable into a horizontal raised position substantially horizontally aligned with said over-cab platform when said over-cab platform is mounted over the cab of the truck and positionable in positions between a horizontal fully lowered position and said horizontal raised position while remaining substantially horizontal,
wherein said head ramp upper and lower decks are stacked one over the other and extend rearwardly of said over-cab platform so that rearmost ends of said head ramps upper and lower decks extend cantilevered rearwardly so as to be positioned over a hitch of the truck,
and wherein said trailer further includes a coupling extending forwardly from the trailer so as to engage and mate with a corresponding coupling on the truck.

3. The system of claim 2 further comprising bridging members mounted so as to cooperate between said rearmost ends of said head ramp upper and lower decks and forwardmost ends of said trailer upper and lower decks to bridge between said upper and lower decks of said head ramp and said trailer respectively when said upper decks of said head ramp and said trailer are substantially horizontally aligned or when said lower decks of said head ramp and said trailer are substantially horizontally aligned.

4. The system of claim 2 wherein said over-cab platform is selectively inclinable from the horizontal so as to selectively raise and lower a rear end of said over-cab platform.

5. The system of claim 4 wherein said head ramp upper deck is selectively inclinable from the horizontal.

6. The system of claim 2 wherein said trailer is a stinger steer trailer.

7. The system of claim 1 wherein said floating rear segment is extendable in length between said mid-section and said floating forward segment so as to lengthen when forming an inclined ramp between said mid-section and said floating forward segment.

8. The system of claim 7 wherein said floating rear segment is telescopically extendable.

9. The system of claim 1 wherein said upper surface of said decking is adapted to increase friction between said decking and a load resting on said decking.

10. The system of claim 9 wherein said decking is of wood.

11. The system of claim 1 wherein said segmented upper deck is formed of an upper pair of wheel-engaging members substantially vertically aligned over said lower pair of wheel-engaging members, so as to form a second central opening between said upper pair of wheel-engaging members, and wherein said segmented upper deck further includes removable decking mountable into said second central opening to form a second substantially solid continuous floor over said second central opening.

\* \* \* \* \*